US008537157B2

(12) United States Patent
Adimatyam et al.

(10) Patent No.: US 8,537,157 B2
(45) Date of Patent: Sep. 17, 2013

(54) THREE-DIMENSIONAL SHAPE USER INTERFACE FOR MEDIA CONTENT DELIVERY SYSTEMS AND METHODS

(75) Inventors: Venkata S. Adimatyam, Irving, TX (US); Sameer Gavade, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 637 days.

(21) Appl. No.: 12/819,350

(22) Filed: Jun. 21, 2010

(65) Prior Publication Data

US 2011/0310100 A1    Dec. 22, 2011

(51) Int. Cl.
*G06T 17/00*    (2006.01)

(52) U.S. Cl.
USPC .......... 345/420; 345/419; 345/424; 345/156; 345/158; 382/254; 700/98; 715/964

(58) Field of Classification Search
USPC ......... 345/419, 420, 424, 156, 158; 382/103; 715/863, 964; 700/98
See application file for complete search history.

(56) References Cited

U.S. PATENT DOCUMENTS

| | | | | |
|---|---|---|---|---|
| 6,123,332 A | * | 9/2000 | Bowling | 273/138.1 |
| 7,006,881 B1 | * | 2/2006 | Hoffberg et al. | 700/83 |
| 7,042,440 B2 | * | 5/2006 | Pryor et al. | 345/158 |
| 7,626,569 B2 | * | 12/2009 | Lanier | 345/156 |
| 7,760,956 B2 | * | 7/2010 | Lin et al. | 382/254 |
| 2009/0059007 A1 | * | 3/2009 | Wagg et al. | 348/157 |
| 2010/0030578 A1 | * | 2/2010 | Siddique et al. | 705/3 |
| 2010/0046842 A1 | * | 2/2010 | Conwell | 382/218 |
| 2011/0034176 A1 | * | 2/2011 | Lord et al. | 455/450 |
| 2011/0098056 A1 | * | 4/2011 | Rhoads et al. | 455/456.1 |
| 2011/0248995 A1 | * | 10/2011 | Vaughan et al. | 345/420 |
| 2011/0280447 A1 | * | 11/2011 | Conwell | 382/103 |

OTHER PUBLICATIONS

Ahamer et al. "Heuristic and pattern recognition in complex geo-referenced systems". Published Feb. 1, 2010.*
"Multimedia Delivery in the Future Internet". Published Oct. 2008.*
Ullmer et al. "Emerging Frameworks for Tangible User Interfaces". Published Aug. 2001.*

* cited by examiner

*Primary Examiner* — Kimbinh T Nguyen

(57) ABSTRACT

Exemplary three-dimensional ("3-D") shape user interfaces for media content delivery systems and methods are disclosed. An exemplary method includes a media content delivery computing system maintaining data representative of a 3-D shape model including a plurality of shape faces, dynamically selecting, in accordance with a shape content selection heuristic, display content for association with at least one of the plurality of shape faces, and utilizing the data representative of the 3-D shape model to render a graphical representation of a 3-D shape in a graphical user interface. In some examples, the method further includes the computing system feeding the dynamically selected display content, which may include one or more video feeds, into at least one of the plurality of shape faces in real time. Corresponding methods and systems are also disclosed.

22 Claims, 17 Drawing Sheets

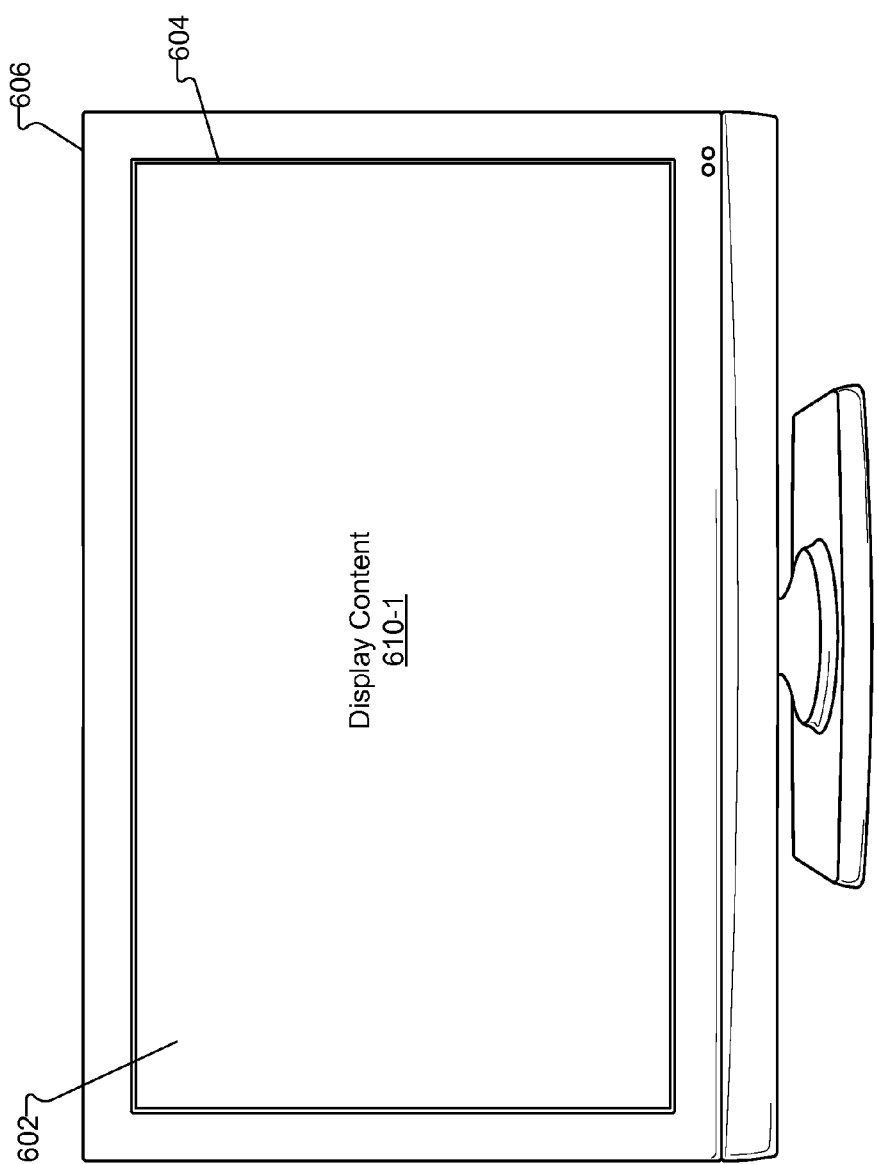

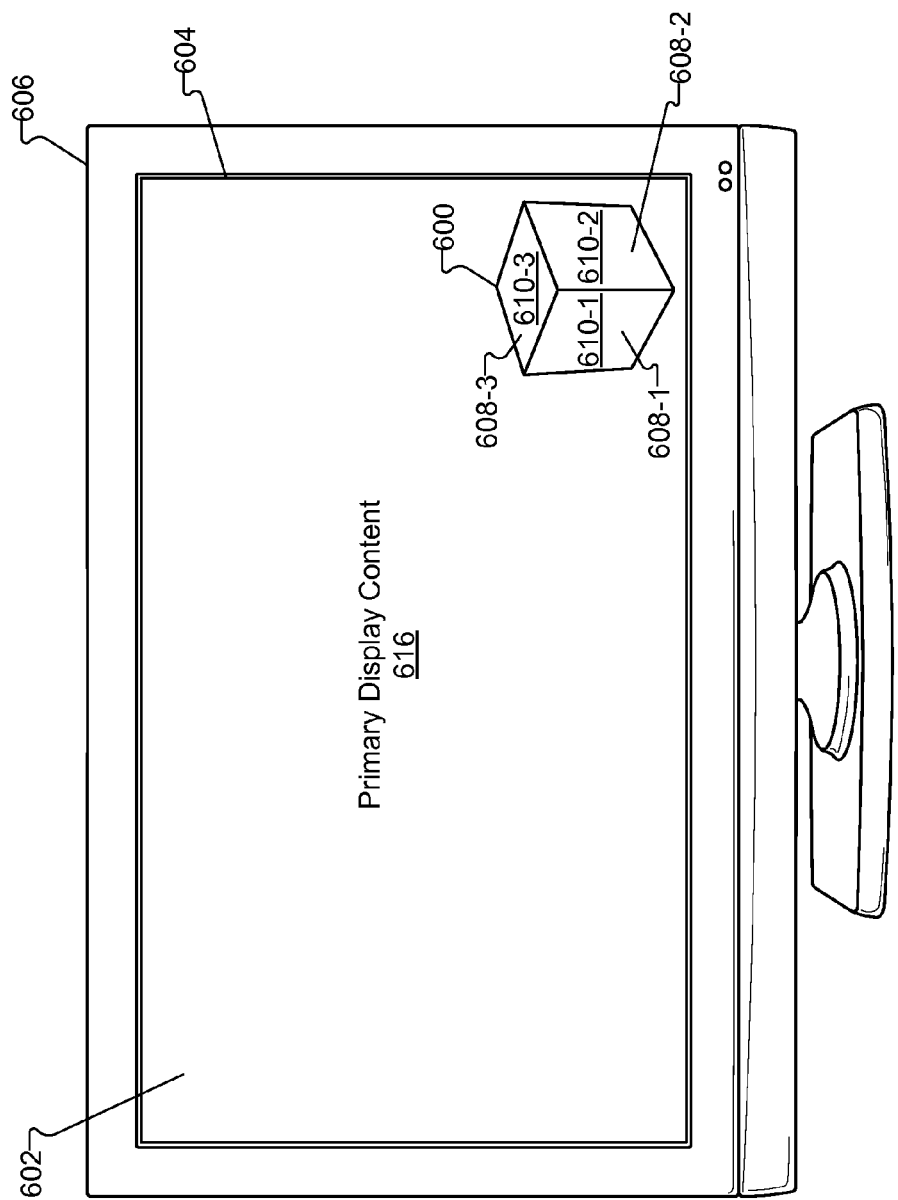

US 8,537,157 B2

THREE-DIMENSIONAL SHAPE USER INTERFACE FOR MEDIA CONTENT DELIVERY SYSTEMS AND METHODS

BACKGROUND INFORMATION

Advances in electronic technologies and devices have put a wide variety of media content and related information at people's fingertips. For example, set-top boxes and other media content access devices are often configured to provide users with access to a large number and variety of media content choices (e.g., television programs, video-on-demand programs, etc.) and information related to the media content choices.

The proliferation of media content and related information on electronic devices has challenged designers of user interfaces for the electronic devices. For example, a common challenge has been to design and implement user interfaces that provide an intuitive and appropriate balance of information, usability, aesthetics, and functionality. The difficulty of the challenge is exacerbated for electronic devices that have limited resources and/or capabilities.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 6A-6E illustrate exemplary graphical representations of a three-dimensional cube in a graphical user interface on a display screen of a display device according to principles described herein.

DETAILED DESCRIPTION OF PREFERRED EMBODIMENTS

Exemplary media content delivery systems and methods are described herein. In particular, exemplary three-dimensional ("3-D") shape user interfaces for media content delivery systems and methods are described herein. An exemplary 3-D shape user interface may be provided for use by a user to interact with a media content delivery system. The 3-D shape user interface may be rendered for display in a graphical user interface and may include multiple shape faces having content associated therewith (e.g., having display content such as one or more real-time video feeds and/or other display content displayed therein). Examples of 3-D shape user interfaces are described in detail herein.

As used herein, the term "content" refers to any content that may be provided by a media content delivery system for experiencing by a user. Examples of content may include, without limitation, media content, information related to media content, display content, audio content, and any electronic data representing information and/or other content that may be provided for experiencing by a user. Display content may include any content (e.g., video content such as a video feed) that may be provided by a media content delivery system for display to a user. Audio content may include any content that may be provided by a media content delivery system for audible output to a user. Media content may include, without limitation, a television program, on-demand media program, pay-per-view media program, broadcast media program (e.g., broadcast television program), multicast media program, narrowcast media program, IPTV program, video program, audio program, streamed media program, recorded live transmission of a media program (e.g., recorded broadcast, multicast, or narrowcast transmission of the media program), advertisement, and any other form of media content program that may be recorded, accessed, presented, or otherwise processed by a media content access device. Information related to media content may include, without limitation, media content metadata, electronic program guide data, media content access information (e.g., program channel and/or tuning information), trailers, titles, images (e.g., poster images), previews, ratings, reviews, synopses, additional or alternative scenes, release information, cast information, genre information, media content program series information, episode information, electronic menu content (e.g., content included in and/or used to generate one or more electronic menus of a media content access device), and any other attribute of and/or information descriptive of or otherwise related to media content.

Figure 1:
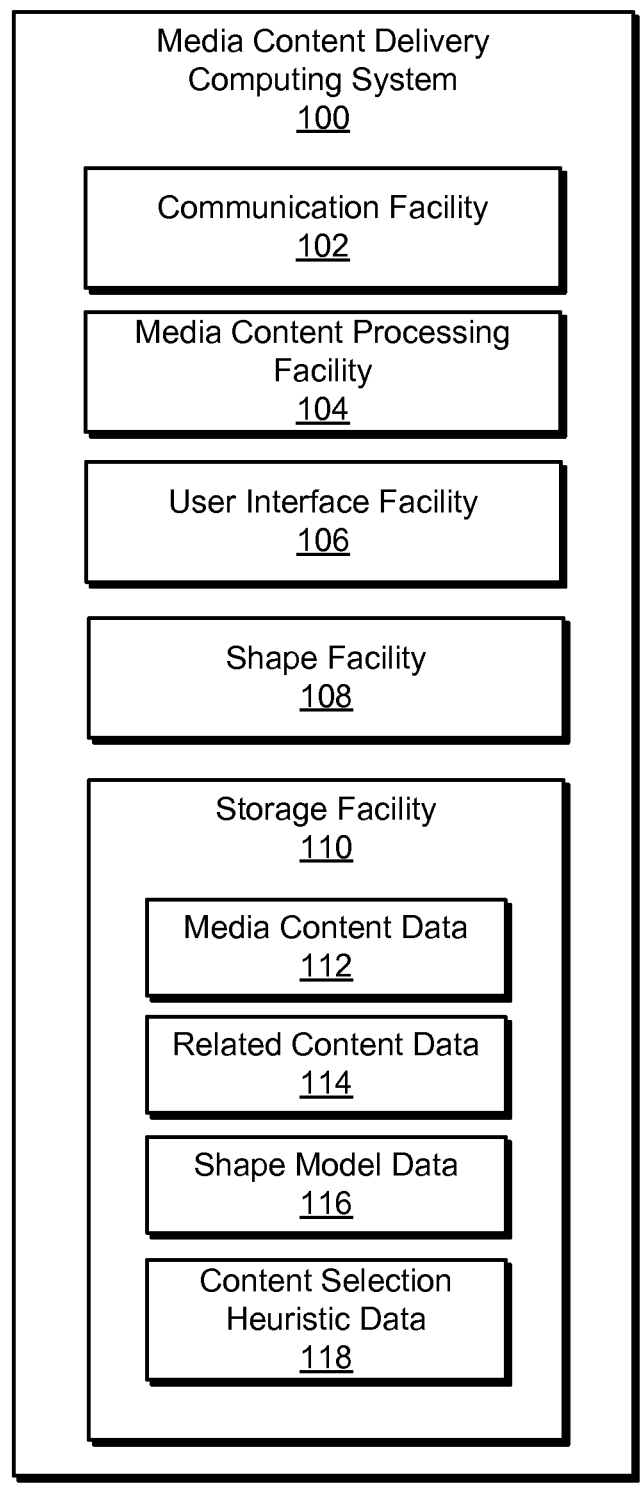
FIG. 1 illustrates an exemplary media content delivery computing system according to principles described herein.

FIG. 1 illustrates an exemplary media content delivery computing system 100 (or simply "system 100"). As shown, system 100 may include, without limitation, a communication facility 102, a media content processing facility 104 (or simply "processing facility 104"), a user interface facility 106, a shape facility 108, and a storage facility 110 selectively and communicatively coupled to one another. Any suitable communication technologies, including any of the communication technologies mentioned herein, may be employed to facilitate communications between facilities 102-110. Each of these facilities will now be described in more detail.

Communication facility 102 may be configured to transmit and/or receive data representative of content to/from one or more computing devices. For example, communication facility 102 may be configured to transmit and/or receive one or more video feeds (e.g., streaming video content such as one or more streaming video content programs). Communication facility 102 may include and/or employ any technologies suitable for transmitting and/or receiving content data, streams, and/or signals, including any of the communication technologies mentioned further below.

Processing facility 104 may be configured to process media content, including encoding, transmitting, receiving, decoding, recording, storing, and/or presenting media content (e.g., one or more video programs in one or more video feeds) for experiencing by a user. For example, processing facility 104 may be configured to present display content and/or audio content of a media content program. Processing facility 104 may include and/or employ any suitable media content processing technologies.

User interface facility 106 may be configured to perform one or more of the user interface operations described herein, including providing output to and/or receiving input from a user. For example, user input may be provided by a user and received by user interface facility 106 by way of one or more user input devices, examples of which may include, but are not limited to, a remote control device, a keyboard, a mouse, a microphone, a signal receiver (e.g., an RF or infrared receiver), a touch screen, a spatial input sensor, and a video camera. Additionally or alternatively, output may be provided by user interface facility 106 to a user by way of one or more output devices, examples of which may include, but are not limited to, a display device (e.g., a television, a computer monitor, etc.) and/or audio output devices (e.g., speakers).

User interface facility 106 may be configured to provide one or more user interfaces through which output may be provided and/or input may be received in a way that allows a user to interact with system 100. In certain embodiments, user interface facility 106 may be configured to generate and provide one or more graphical user interfaces ("GUIs") for display, including any of the exemplary GUIs described herein. Generation of a GUI may include rendering one or more graphical elements included in the GUI. For example, user interface facility 106 may render a graphical representation of a 3-D shape, including any of the exemplary 3-D cubes described herein, as directed by shape facility 108 for inclusion in a GUI. For instance, user interface facility 106 may receive data representative of a 3-D shape from shape facility 108 and utilize the received data to render a graphical representation of the 3-D shape in a GUI. The graphical representation of the 3-D shape in the GUI may provide a 3-D shape user interface through which a user may interact with system 100.

Shape facility 108 may be configured to perform one or more of the 3-D shape operations described herein, including generating a graphical representation of a 3-D shape for presentation by way of a media content access subsystem. In certain embodiments, shape facility 108 may be configured to use data representative of a 3-D shape model to generate the 3-D shape in accordance with the 3-D shape model. To this end, shape facility 108 may be configured to maintain data representative of one or more 3-D shape models (e.g., one or more 3-D cube models). As described in more detail below, a 3-D shape model, and consequently a graphical representation of a 3-D shape generated based on the model, may include multiple shape faces capable of having content dynamically and/or selectively associated therewith.

Shape facility 108 may be configured to selectively associate content with one or more faces of a 3-D shape. To this end, shape facility 108 may maintain data representative of a shape content selection heuristic, which may be used by shape facility 108 to select content for association with one or more shape faces. The data representative of the shape content selection heuristic may be maintained in any suitable way and/or form and may specify one or more conditions to be considered by shape facility 108 to select content for association with one or more faces of a 3-D shape.

In certain embodiments, shape facility 108 may be configured to select content dynamically. The dynamic selection may be performed as part of or as a precursor to generation and/or modification of a view of a 3-D shape interface. For example, content may be dynamically selected for association with one or more faces of a 3-D shape in response to an occurrence of a predefined trigger event. Examples of predefined trigger events and dynamic selection and association of content with faces of a 3-D shape are described further below.

After shape facility 108 has generated a 3-D shape, shape facility 108 may provide data representative of the 3-D shape to user interface facility 106 for use in rendering a graphical representation of the 3-D shape in a GUI. Exemplary 3-D shapes and GUIs, which may form 3-D shape user interfaces configured to facilitate user interaction with system 100, are described in detail further below.

Storage facility 110 may be configured to store media content data 112, related content data 114, shape model data 116, and content selection heuristic data 118. Media content data 112 may include any data representative of media content. Related content data 114 may include any data representative of information and/or other content that is related to media content represented by media content data 112. Shape model data 116 may include any data representative of one or more 3-D shape models (e.g., one or more 3-D cube models) that may be used by shape facility 108 to generate one or more 3-D shapes (e.g., one or more 3-D cubes). Content selection heuristic data 118 may include any data representative of a content selection heuristic that may be used by shape facility 108 to select content for association with a 3-D shape. It will be recognized that storage facility 110 may maintain additional or alternative data as may serve a particular application.

Figure 2:
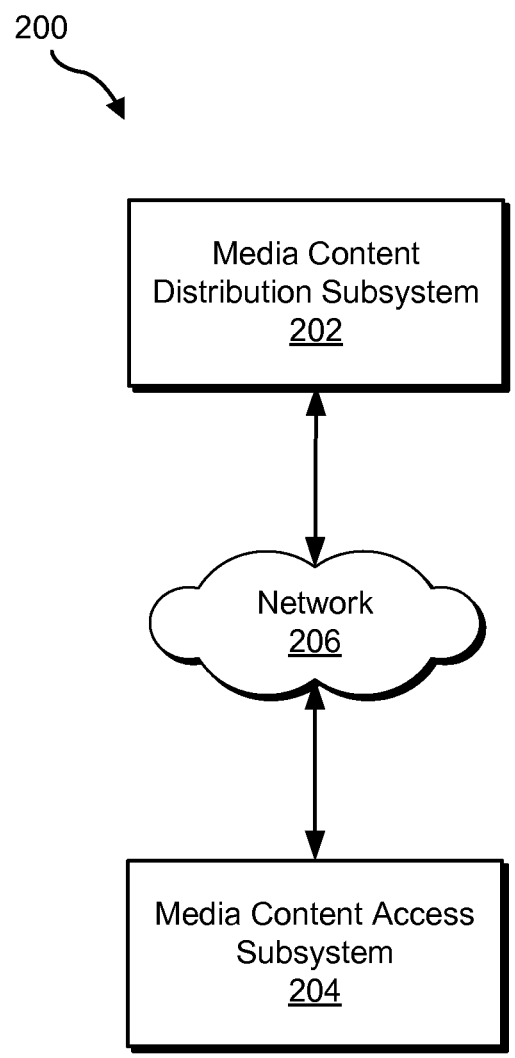
FIG. 2 illustrates an exemplary implementation of the system of FIG. 1 according to principles described herein.

FIG. 2 illustrates an exemplary implementation 200 of system 100 in which a media content distribution subsystem 202 (or simply "distribution subsystem 202") is communicatively coupled to a media content access subsystem 204 (or simply "access subsystem 204"). Any of the facilities 102-110 may be implemented on one or both of distribution subsystem 202 and access subsystem 204.

Access subsystem 204 may be configured to communicate with and receive a signal and/or data stream containing data representative of media content and/or information associated with media content (e.g., metadata, program guide data, etc.) from distribution subsystem 202. For example, distribution subsystem 202 may transmit and access subsystem 204 may receive one or more video feeds, which may be in the form of one or more streaming, live video feeds. Access subsystem 204 and distribution subsystem 202 may communicate using any suitable communication technologies, devices, networks, media, and protocols supportive of data communications.

For example, as shown in FIG. 2, distribution subsystem 202 may be configured to communicate with access subsystem 204 over a network 206 (and communications links thereto). Network 206 may include one or more networks or types of networks capable of carrying communications and/ or data signals between distribution subsystem 202 and access subsystem 204. For example, network 206 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Distribution subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), media content transport stream protocols (e.g., MPEG-2), Ethernet, and any other suitable communications technologies, devices, media, and protocols.

While FIG. 2 shows distribution subsystem 202 and access subsystem 204 communicatively coupled via network 206, additional or alternative configurations may be used in other embodiments. In certain alternative embodiments, for example, distribution subsystem 202 and access subsystem 204 may be integrated together and/or may be configured to communicate directly without going through network 206.

In some examples, distribution subsystem 202 may be configured to generate or otherwise provide media content to access subsystem 204. Distribution subsystem 202 may also be configured to provide information related to the media content (e.g., metadata, program guide data, etc.) to access subsystem 204. Distribution subsystem 202 may be configured to transmit data representative of media content and/or related information to access subsystem 204 in any suitable way. In certain embodiments, for example, distribution subsystem 202 may be configured to transmit one or more media content transport streams (e.g., MPEG-2 streams) containing data representative of one or more media content programs (e.g., one or more video programs) and related information to access subsystem 204. In some examples, the media content transport streams may be transmitted in accordance with a predefined transmission schedule and/or in response to one or more requests from access subsystem 204.

Access subsystem 204 may be configured to facilitate access by a user to media content and/or related information received from distribution subsystem 202. To this end, access subsystem 204 may present accessed media content for experiencing (e.g., viewing) by an end user, record the media content, store the media content, and/or perform any other operation associated with the media content as may serve a particular implementation. For example, access subsystem 204 may process and present video content included in one or more video feeds (e.g., live television and/or on-demand video feeds) received by access subsystem 204 from distribution subsystem 202.

Figure 3:
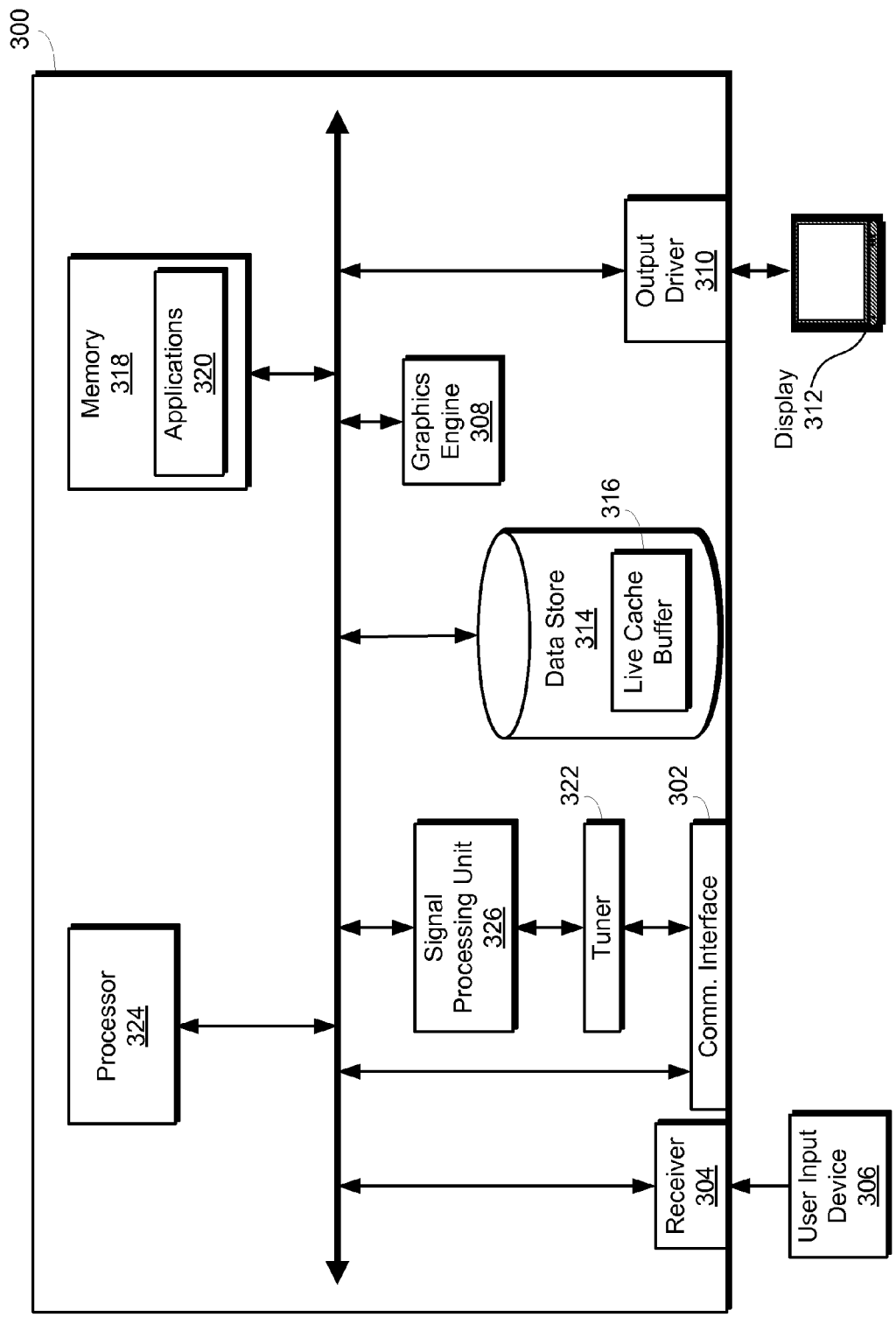
FIG. 3 illustrates an exemplary media content access device implementing the media content access subsystem of FIG. 2 according to principles described herein.

Access subsystem 204 and/or components of access subsystem 204 may be implemented as may suit a particular application. FIG. 3 illustrates an exemplary media content access device 300 (or simply "device 300") having access subsystem 204 implemented thereon. Device 300 may include one or more of the components shown in FIG. 3 and may be configured to perform one or more of the processes and/or operations described herein. Device 300 may include, but is not limited to, a set-top box device, a DVR device, a multi-room DVR device, a media content processing device, a media content access device, a communications device, a mobile device (e.g., a mobile phone device), a handheld device, a personal computer, a phone device, a personal-digital assistant device, a gaming device, a television device, a personal media player device, and/or any device configured to perform one or more of the processes and/or operations described herein.

As shown in FIG. 3, device 300 may include a communication interface 302 configured to receive media content (e.g., media content) and/or information related to media content (e.g., metadata, program guide data, etc.) in any acceptable format from distribution subsystem 202 or from any other suitable external source. Communication interface 302 may include any device, logic, and/or other technologies suitable for receiving signals and/or data representative of media content and/or information related to media content. Communication interface 302 may be configured to interface with any suitable communication media, protocols, and formats, including any of those mentioned above.

Device 300 may include a receiver 304 configured to receive user input signals from a user input device 306. User input device 306 may include, for example, a remote control device, a user input sensor (e.g., a video camera), and/or any other suitable input device and may be configured to communicate with receiver 304 via a wireless link, electrical connection, or any other suitable communication link.

Device 300 may include a graphics engine 308 and an output driver 310. Graphics engine 308 may be configured to generate graphics to be provided to output driver 310, which may be configured to interface with or drive a display 312. Output driver 310 may provide output signals to display 312, the output signals including graphical content (e.g., media content and/or program guide media content) generated by graphics engine 308 and to be presented by display 312 for experiencing by a user. For example, output driver 310 may provide data representative of a GUI including a program guide view, a media playback view, and/or a 3-D shape user interface view to display 312 for presentation to the user.

Data store 314 may include one or more data storage media, devices, or configurations and may employ any type, form, and combination of storage media. For example, data store 314 may include, but is not limited to, a hard drive, network drive, flash drive, magnetic disc, optical disc, or other non-volatile storage unit. Media content and/or data associated with media content may be temporarily and/or permanently stored in data store 314.

Data store 314 is shown to be included within device 300 in FIG. 3 for illustrative purposes only. It will be understood that data store 314 may additionally or alternatively be located external to device 300.

Data store 314 may include one or more live cache buffers 316. Live cache buffer 316 may additionally or alternatively reside in memory 318 or in a storage device external to device 300. In some examples, media content data may be temporarily stored in live cache buffer 316 to facilitate recording of media content and/or presentation of media content.

Device 300 may include memory 318. Memory 318 may include, but is not limited to, FLASH memory, random access memory ("RAM"), dynamic RAM ("DRAM"), other suitable computer-readable media, or any combination or sub-combination thereof. In some examples, one or more applications 320 configured to run on or otherwise be executed by device 300 may reside in memory 318.

Device 300 may include one or more tuners 322. Tuner 322 may be configured to selectively receive media content carried on a particular content carrier such that the media content may be processed by device 300. In some examples, media content received by tuner 322 may be temporarily buffered, or stored, in the live cache buffer 316. If there are multiple tuners 322, there may be a live cache buffer 316 corresponding to each of the tuners 322.

While tuner 322 may be used to receive certain media content-carrying signals transmitted by distribution subsystem 202, device 300 may be configured to receive other types of media content signals (including media content signals and/or program guide data signals) from distribution subsystem 202 and/or one or more other sources without using a tuner. For example, distribution subsystem 202 may transmit digital streams of data packets (e.g., Internet Protocol ("IP") based data packets) that can be received without using a tuner. For such types of media content signals, communication interface 302 may receive and forward the signals directly to other components of device 300 (e.g., processor 324 or signal processing unit 326) without the signals going through tuner 322. For an IP-based signal, for example, signal processing unit 326 may function as an IP receiver.

Device 300 may include at least one processor, such as processor 324, configured to control and/or perform one or more operations of device 300. Device 300 may also include a signal processing unit 326 configured to process incoming media content. Signal processing unit 326 may be configured, for example, to demodulate and parse encoded digital media content. In some examples, device 300 may include one or more signal processing units 326 corresponding to each of the tuners 322.

The device 300 shown in FIG. 3 is illustrative only. Access subsystem 204 may include or be implemented on one or more other suitable devices in other embodiments.

Figure 4:
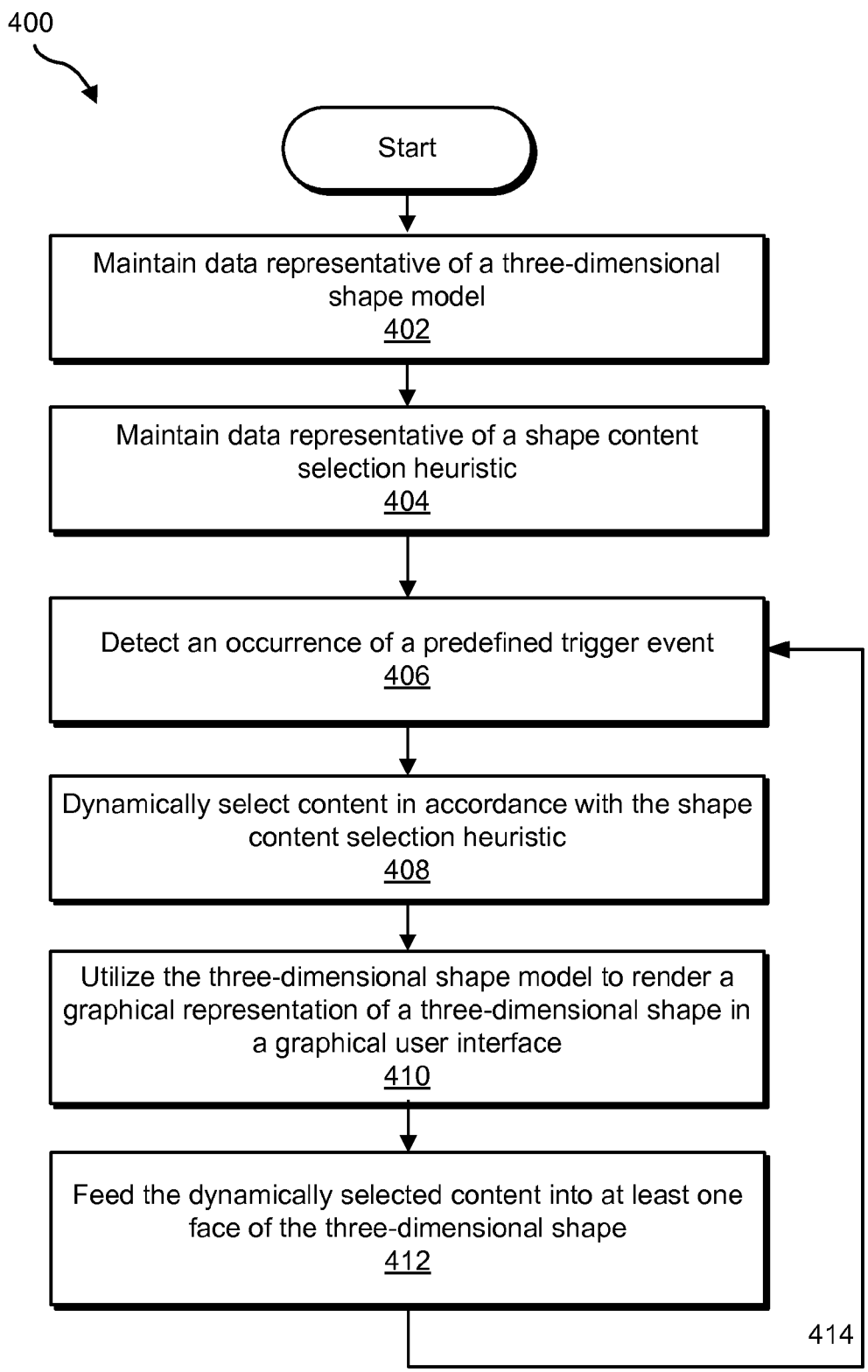
FIG. 4 illustrates an exemplary method of providing a three-dimensional shape user interface according to principles described herein.

FIG. 4 illustrates an exemplary method 400 of providing a 3-D shape user interface. While FIG. 4 illustrates exemplary steps according to one embodiment, other embodiments may omit, add to, reorder, combine, and/or modify any of the steps shown in FIG. 4. The steps shown in FIG. 4 may be performed by any component or combination of components of system 100.

In step 402, data representative of a 3-D shape model may be maintained. For example, shape facility 108 may maintain data representative of a 3-D shape model (e.g., a 3-D cube model) as shape model data 116 in storage facility 110. Any information potentially useful for representing a 3-D shape model may be included in shape model data 116. For example, shape model data 116 may include data representative of shape faces, sizes and/or dimensions of shape faces, relationships of shape faces to one another, orientations of shape faces, and/or any other information that may be used to represent a model of a 3-D shape.

Figure 5:
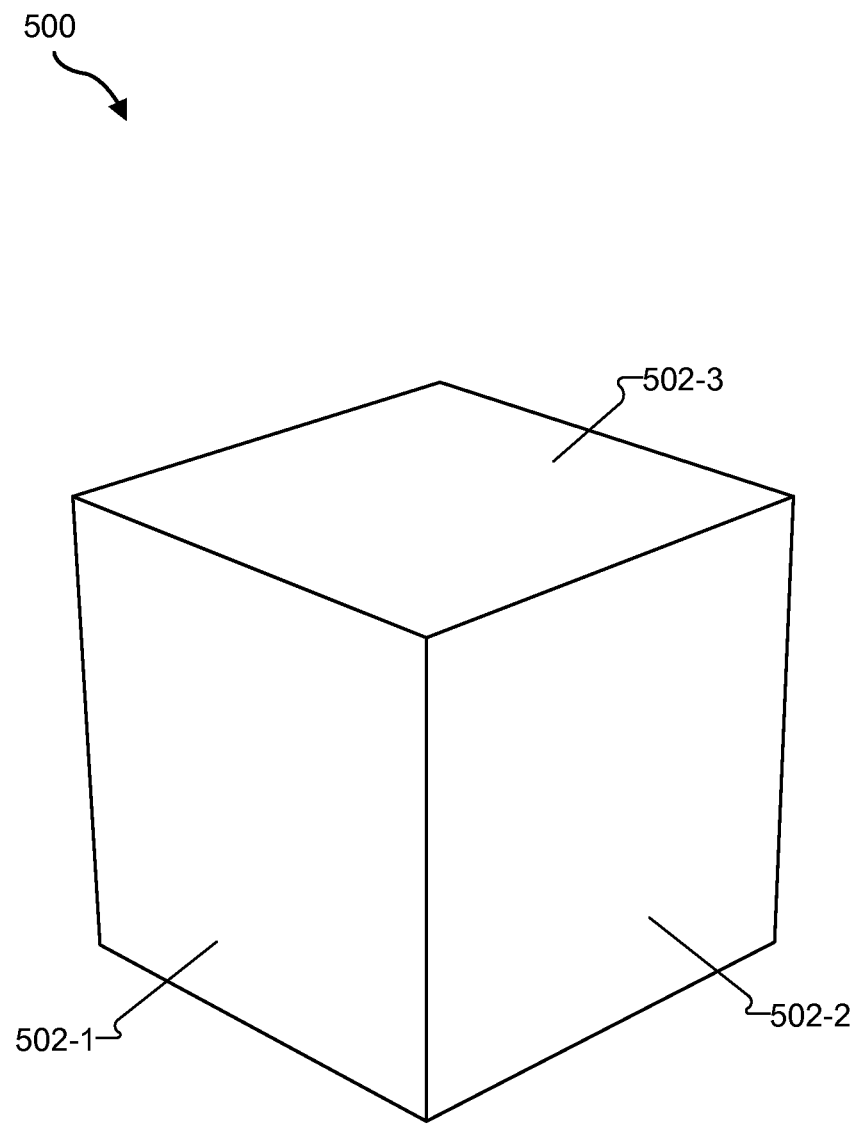
FIG. 5 illustrates an exemplary representation of a three-dimensional cube model according to principles described herein.

FIG. 5 illustrates an exemplary representation of a 3-D shape in the form of a 3-D cube 500 that may be represented in shape model data 116. 3-D cube 500 may include a plurality of cube faces (e.g., six cube faces) arranged to form 3-D cube 500. In the graphical representation shown in FIG. 5, 3-D cube 500 is oriented such that three cube faces 502-1, 502-2, and 502-3 are visible. Other faces of 3-D cube 500 are not visible in the view shown in FIG. 5. The faces of cube 500 may collectively be referred to as cube faces 502.

The graphical representation of 3-D cube 500 shown in FIG. 5 is illustrative only. Additional or alternative models of 3-D cubes and/or other 3-D shapes may be represented by shape model data 116 as may suit a particular implementation. Alternative or additional shape models may have a variety of different attributes, including, for example, different sizes, dimensions, orientations, viewing angles or perspectives, and any other differences in attributes as may suit a particular implementation. In addition, while the term "cube" is used to describe certain exemplary embodiments, it will be understood that the term "cube" as used herein may additionally or alternatively include a block (e.g., a hexahedron) having equal squares or non-equal rectangles as faces. Moreover, other 3-D shapes having any number of faces may be used in other embodiments in accordance with principles described herein.

Returning to FIG. 4, in step 404, data representative of a shape content selection heuristic may be maintained. For example, shape facility 108 may maintain data representative of a shape content selection heuristic as content selection heuristic data 118 in storage facility 110. The shape content selection heuristic may specify one or more conditions that may be used by shape facility 108 to select content for association with a 3-D shape. Examples of such conditions may include, without limitation, one or more prioritization rules for use in prioritizing content, context-specific rules for use in selecting content based on context (e.g., an operational context of a media content access device), relatedness rules for use in identifying relationships between content and/or information related to media content, user-configurable conditions (e.g., one or more conditions customized by an end user) for use in selecting content based on one or more parameters specified by an end user, user-history-based rules for use in selecting content based on information included in a record of a user history (e.g., history data indicated a user preference and/or pattern), and/or any other rules and/or parameters upon which a selection of content may be based. Data representative of the shape content selection heuristic may be maintained in any suitable way, such as within one or more data tables.

In step 406, an occurrence of a predefined trigger event may be detected. For example, shape facility 108 and/or other component(s) of system 100 may detect an occurrence of a predefined trigger event. A predefined trigger event may include any event that has been predefined to trigger to one or more operations of shape facility 108. For example, a predefined trigger event may include, without limitation, a request to launch a 3-D shape user interface, a request to display a graphical representation of a 3-D shape in a GUI, a request to manipulate the display of the 3-D shape in the GUI (e.g., a request to rotate the 3-D shape in the GUI), a request to access content associated with the 3-D shape in the GUI (e.g., a selection of display content included in a face of the 3-D shape), a powering on of a media content access device, an awakening of a media content access device from a standby state, a boot of a media content access device, a user login, a launch of a 3-D shape user interface application by a media content access device, a launch of a particular menu user interface, a launch of a particular application running on a media content access device (e.g., a launch of a program guide application), a change in an availability of content (e.g., media content, such as a particular media content program and/or video feed, becoming available or unavailable such as may occur at a beginning or end of the media content program), and any other suitable predefined event related to a 3-D shape and/or system 100. In some examples, one or more of the predefined trigger events may be initiated by a user of access subsystem 204 providing user input to access subsystem 204 and/or distribution subsystem 202.

In step 408, content may be dynamically selected in accordance with the shape content selection heuristic. In some examples, step 408 may be performed in response to the detection of the predefined trigger event in step 406. For example, shape facility 108 may dynamically select content in accordance with the shape content selection heuristic in response to the detection of the predefined trigger event in step 406. The selection may be based on any condition or conditions specified by the shape content selection heuristic, including any of the exemplary conditions disclosed herein.

Shape facility 108 may select content from all or any content that is accessible by access subsystem 204 and/or a media content access device implementing access subsystem 204. The content may include content that is stored locally by access subsystem 204 and/or content that is remotely accessible by the access subsystem 204. In some examples, shape facility 108 may select at least one video feed from one or more video feeds received by communication facility 102.

Step 408 may include selecting content for association with one or more faces of a 3-D shape. In some examples, content may be selected for association with each face of a 3-D shape. In other examples, content may be selected only for certain faces of a 3-D shape, such as faces of a 3-D shape that will be visible when the 3-D shape is rendered in a GUI. Content may be selected independently for a face of a 3-D shape, or content may be selected for a face of a 3-D shape based at least in part on a relationship between the shape face and one or more other shape faces and/or on a relationship between the content and other content associated with one or more other shape faces. For example, when selecting content to associate with a shape face, content associated with an adjacent shape face may be considered.

In step 410, the 3-D shape model maintained in step 402 may be utilized to render a graphical representation of a 3-D shape in a GUI. For example, shape facility 108 may utilize the 3-D shape model to generate data representative of a 3-D shape and associations of content dynamically selected in step 408 with the 3-D shape. Shape facility 108 may provide this data to user interface facility 106 and direct user interface facility 106 to utilize the data to render the 3-D shape in a GUI.

In step 412, the content dynamically selected in step 408 may be fed into at least one face of the 3-D shape. Accordingly, the content may be associated with at least one face of the 3-D shape dynamically such that the content may be updated while the 3-D shape is displayed in the GUI. For example, the content may include at least one video program included in at least one video feed. System 100 may feed the video feed into a face of the 3-D shape such that the video program is played back within the face of the 3-D shape. In certain examples, the content may be fed into at least one face of the 3-D shape in real time. Accordingly, the 3-D shape may display one or more live video feeds received by communication facility 102.

FIG. 4 depicts an arrow 414 connecting step 412 to step 406. Arrow 412 represents that one or more of the steps 406-412 may be repeated each time a predefined trigger event is detected. That is, each time an occurrence of a predefined trigger event is detected in step 406, step 408 may be performed to dynamically select content based on the shape content selection heuristic, step 410 may be performed to render a graphical representation of a 3-D shape in a GUI based on the 3-D shape model and the dynamically selected content, and/or step 412 may be performed to feed the dynamically selected content into at least one face of the 3-D shape in the GUI. Accordingly, content associated with a 3-D shape may be updated in response to a detection of a trigger event.

Figure 6A:
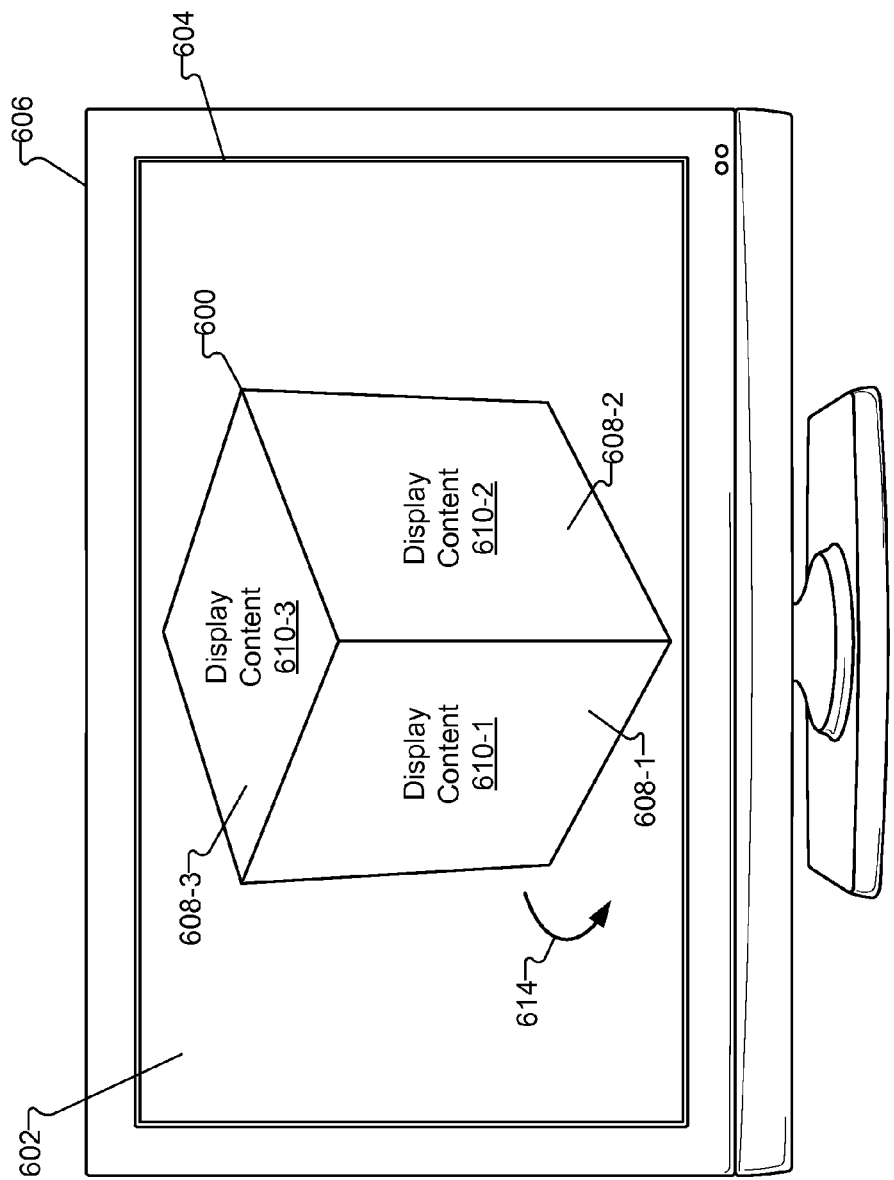

FIGS. 6A-6D illustrate exemplary graphical representations of a 3-D cube that may be rendered in step 410 of FIG. 4. As shown in FIG. 6A, an exemplary graphical representation of a 3-D cube 600 may be displayed in a GUI 602 on a display screen 604 of a display device 606 (e.g., a television or a computer monitor). 3-D cube 600 may include a plurality of cube faces (six cube faces), which may be collectively referred to as cube faces 608. In the view shown in FIG. 6A, cube faces 608-1, 608-2, and 608-3 are visible.

Figure 6B:
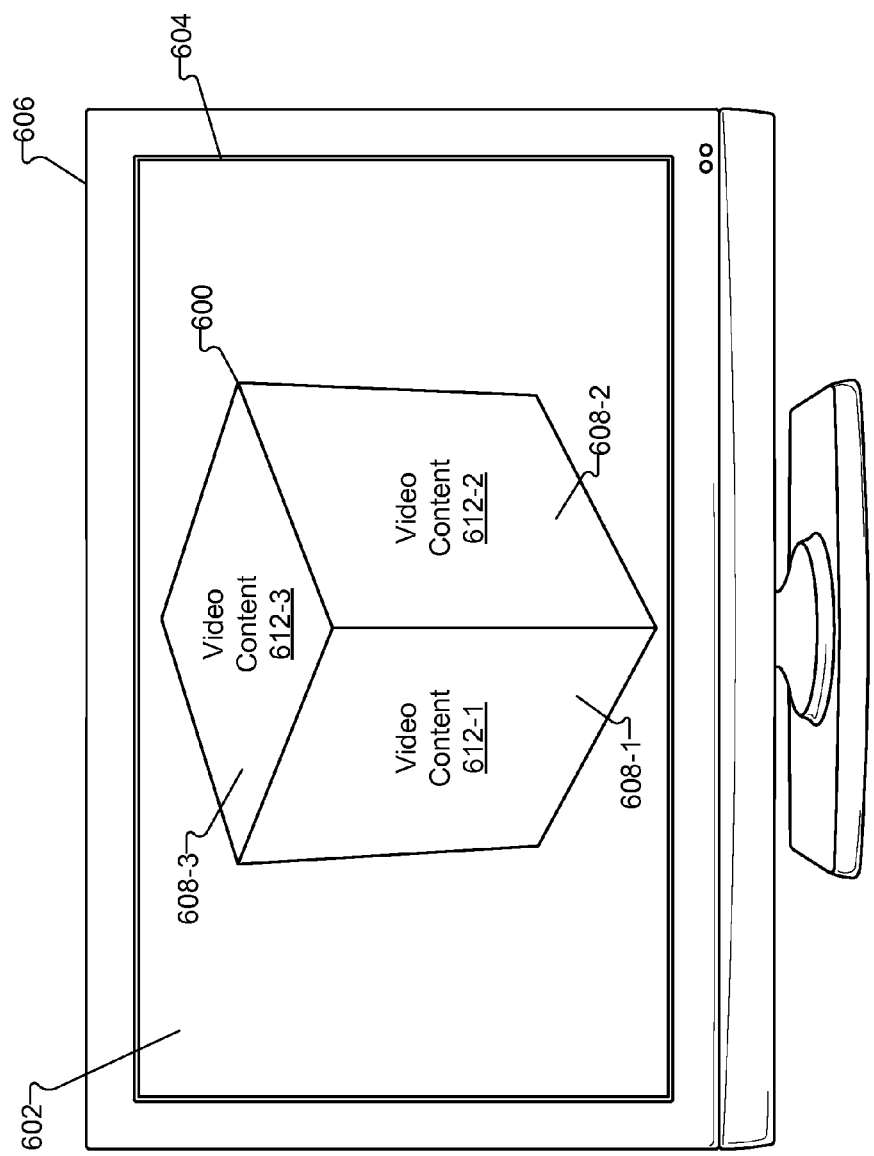

Content may be associated with one or more of the cube faces 608 of 3-D cube 600. The associated content may include content dynamically selected in step 408 of FIG. 4. In the example shown in FIG. 6A, the association of content with cube faces 608-1, 608-2, and 608-3 includes a display of display content within cube faces 608-1, 608-2, and 608-3. In particular, cube face 608-1 includes display content 610-1 displayed therein, cube face 608-2 includes display content 610-2 displayed therein, and cube face 608-3 includes display content 610-3 displayed therein. In certain examples, the display content in one or more of the cube faces 608-1, 608-2, and 608-3 may include video content such as one or more video programs carried by one or more video feeds fed into the one or more cube faces 608-1, 608-2, and 608-3. For example, access subsystem 204 may receive multiple video feeds (e.g., live video feeds carried by one or more media content streams) from distribution system 202 in real time, and one or more of the video feeds may be selected and associated with one or more faces of a 3-D cube in real time as described herein. To illustrate, access subsystem 204 may receive multiple transmissions of live television programs on multiple program channels. Access subsystem 204 may select one or more of the television programs for inclusion in one or more faces of a 3-D cube. Accordingly, a user of access subsystem 204 may be able to utilize a 3-D cube user interface to conveniently navigate and access one or more video feeds received by access subsystem 204. FIG. 6B illustrates 3-D cube 600 including video content 612-1, 612-1, and 612-3 displayed within cube faces 608-1, 608-2, and 608-3, respectively.

3-D cube 600, as displayed in GUI 602, may provide a user interface that may be utilized by a user of access subsystem 204 to access and/or experience content associated with one or more faces 608 of 3-D cube 600, as well as other content related to the content associated with one or more faces 608 of 3-D cube 600. For example, a user may provide input to select certain display content included in a face 608 of 3-D cube 600. To illustrate, while GUI 602 is displayed as shown in FIG. 6A, the user may provide input to request that display content 610-1 in cube face 608-1 be selected. In response to the request, system 100 may perform one or more operations related to display content 610-1, including updating GUI 602 such that display content 610-1 and/or other content associated with display content 610-1 is displayed in GUI 602. In some examples, the selected display content and/or other content associated therewith may be displayed in a full-screen view in GUI 602. For example, FIG. 6C illustrates selected display content 610-1 displayed in a full-screen view within GUI 602. Additionally or alternatively, audio content associated with the selected display content may be played back in response to a selection of the display content.

Figure 6D:
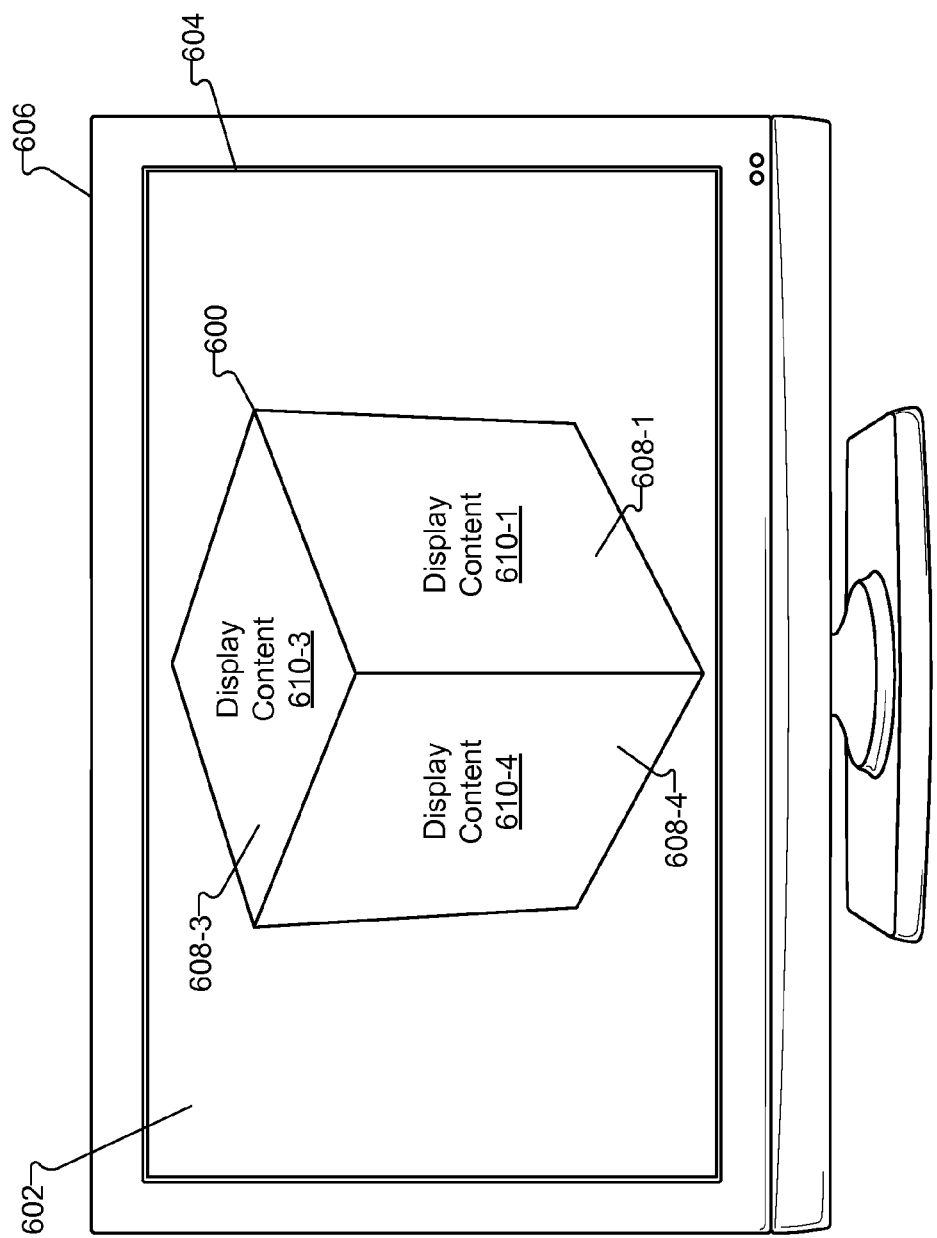

As another example, while the view shown in FIG. 6A is displayed, a user may provide input to request that 3-D cube 600 be rotated within GUI 602. In response to the request, 3-D cube 600, which may be configured to be rotatable in certain embodiments, may be rotated by system 100 within GUI 602 such that a different view of 3-D cube 600 is displayed in GUI 602. The rotation of 3-D cube 600 may include selection of other content (e.g., additional and/or alternative content) for association with one or more faces 608 of 3-D cube 600. To illustrate, a user may provide input requesting that 3-D cube 600 be rotated to the right as represented by arrow 614 in FIG. 6A. In response to the request, system 100 may perform one or more operations to render a rotated view of 3-D cube 600 in GUI 602. FIG. 6D illustrates an example of a rotated view of 3-D cube 600 in GUI 602. As shown, 3-D cube 600 has been rotated to the right in GUI 602 such that cube face 608-2 has moved off-screen and is no longer visible, cube face 608-1 has moved to the position previously occupied by cube face 608-2, and cube face 608-4 has become visible by moving into the position previously occupied by cube face 608-1. Cube face 608-3 may rotate accordingly but remains in the same position atop 3-D cube 600. The display content associated with the cube faces 608 may move along with the cube faces 608 such that display content 610-1, 610-3, and 610-4 is displayed within cube faces 608-1, 608-3, and 608-4, respectively, as shown in FIG. 6D.

As another example, while the view shown in FIG. 6A is displayed, a user may provide input to request that 3-D cube 600 be resized within GUI 602. In response to the request, 3-D cube 600 may be resized within GUI 602 such that a different view of 3-D cube 600 is displayed in GUI 602. FIG. 6E illustrates an example of a resized view of 3-D cube 600 in GUI 602. As shown, instead of being positioned as shown in FIG. 6A, 3-D cube 600 is positioned toward the lower right corner of GUI 602. In addition, the size of 3-D cube 600 in FIG. 6D is smaller than the size of 3-D cube 600 FIG. 6A. As an alternative to being resized, 3-D cube 600 may be initially displayed as shown FIG. 6E without being resized.

The exemplary graphical representation of 3-D cube 600 shown in FIG. 6E may facilitate a display of 3-D cube 600 together with other content in GUI 602. For example, FIG. 6E shows primary display content 616 displayed within GUI 602. Primary display content 616 may occupy at least a substantial portion of display screen 604. For instance, primary display content 616 may include a full-screen or near full-screen display of media content (e.g., full-screen playback of a media content program). 3-D cube 600 may be displayed as an overlay to primary display content 616 and GUI 602. Accordingly, a user may be able to concurrently view primary display content 616 and 3-D cube 600 together in GUI 602.

The exemplary graphical representations of 3-D cube 600 shown in FIGS. 6A-6E are illustrative only. 3-D cube 600 and/or another 3-D shape may be displayed differently as may suit a particular implementation, context, and/or display parameter(s).

System 100 may be configured to enable a user to interact a 3-D shape in a GUI in any suitable way such that the user may utilize the 3-D shape in the GUI to access content associated with the 3-D shape, as well as additional content. For example, the user may provide input requesting that the 3-D shape be rotated to change which sides of the 3-D shape are displayed in the GUI (and consequently which display content is displayed within the 3-D shape in the GUI), select display content displayed within the 3-D shape to access additional content and/or information, resize the 3-D shape in the GUI, and any other manipulation of the 3-D shape within the GUI. Accordingly, the 3-D shape in the GUI may provide an intuitive user interface with which a user may interact to access content.

A user may interact with a 3-D shape user interface in any suitable way, including by providing input configured to control or otherwise interact with the 3-D shape user interface. The input may be provided and received in any suitable way. As an example, a user may actuate one or more input buttons of a user input device (e.g., a remote control device) to provide input to interact with the 3-D shape user interface. For example, the user may actuate a directional arrow button of a user input device to request that a 3-D shape be rotated in a corresponding direction in a GUI.

Figure 7:
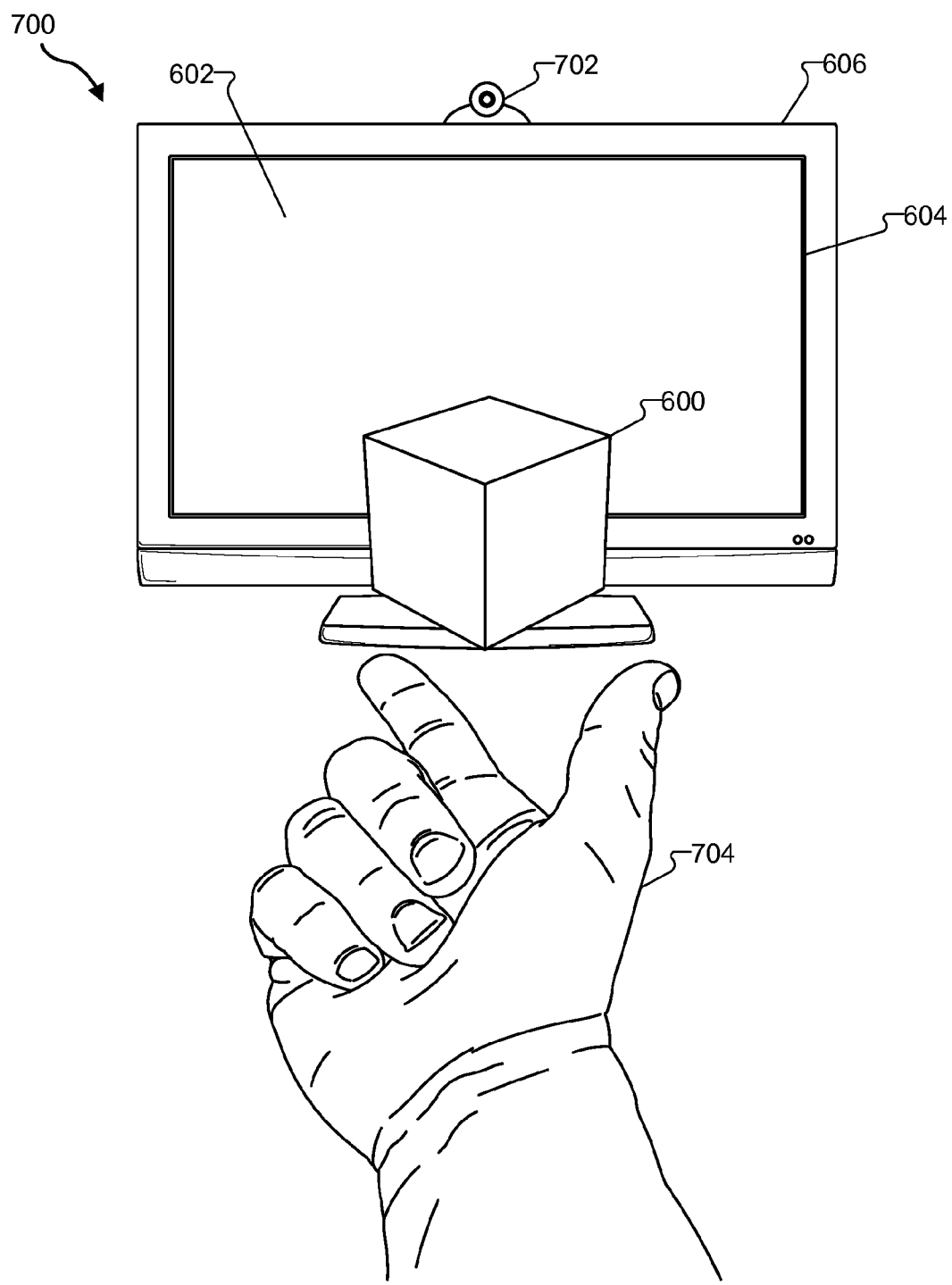
FIG. 7 illustrates an exemplary implementation of the system of FIG. 1 in which visual user input may be detected and utilized to facilitate user interaction with a three-dimensional cube user interface according to principles described herein.

As another example, system 100 may be configured to detect spatial input provided by a user, such as visual input provided by a user. To illustrate, FIG. 7 shows an exemplary implementation 700 of the system of FIG. 1 in which visual input provided by a user may be detected and utilized to facilitate user interaction with a 3-D shape user interface, such as a 3-D cube user interface. As shown in FIG. 7, implementation 700 may include a spatial input sensor such as a video camera 702, which may be configured to capture images of one or more hand gestures acted out by a hand 704 of a user within a physical user space in front of display screen 604 of display device 606. System 100 may detect predefined hand gestures and perform one or more operations in response to the hand gestures. For example, a user may act out a particular hand gesture to request that a 3-D cube be rotated in a corresponding direction in a GUI.

In certain embodiments, system 100 may be configured to detect predefined hand gestures that mimic hand gestures that may be used to manipulate a physical object such as a physical cube. Accordingly, a user may intuitively move her hand in a way that would manipulate a physical cube in order to perform a hand gesture that may be detected and used by system 100 to trigger a manipulation of a 3-D cube in a GUI. For example, a user may move her hand as if rotating a physical cube. System 100 may detect the hand gesture and correspondingly rotate a 3-D cube within a GUI. Additional or alternative gestures may be used in other examples.

To further enhance an experience of a user, implementation 700 may be configured to employ one or more 3-D display technologies (e.g., one or more 3-D TV technologies) to display a 3-D shape user interface. To illustrate, FIG. 7 shows a graphical representation of 3-D cube 600 as it may appear to a user when it is displayed using 3-D display technologies. With this perspective, performance of certain hand gestures that mimic manipulation of a physical cube may be very intuitive to a user. For example, the user may envision reaching out her hand to manipulate the 3-D display of the 3-D cube 600.

Figure 8:
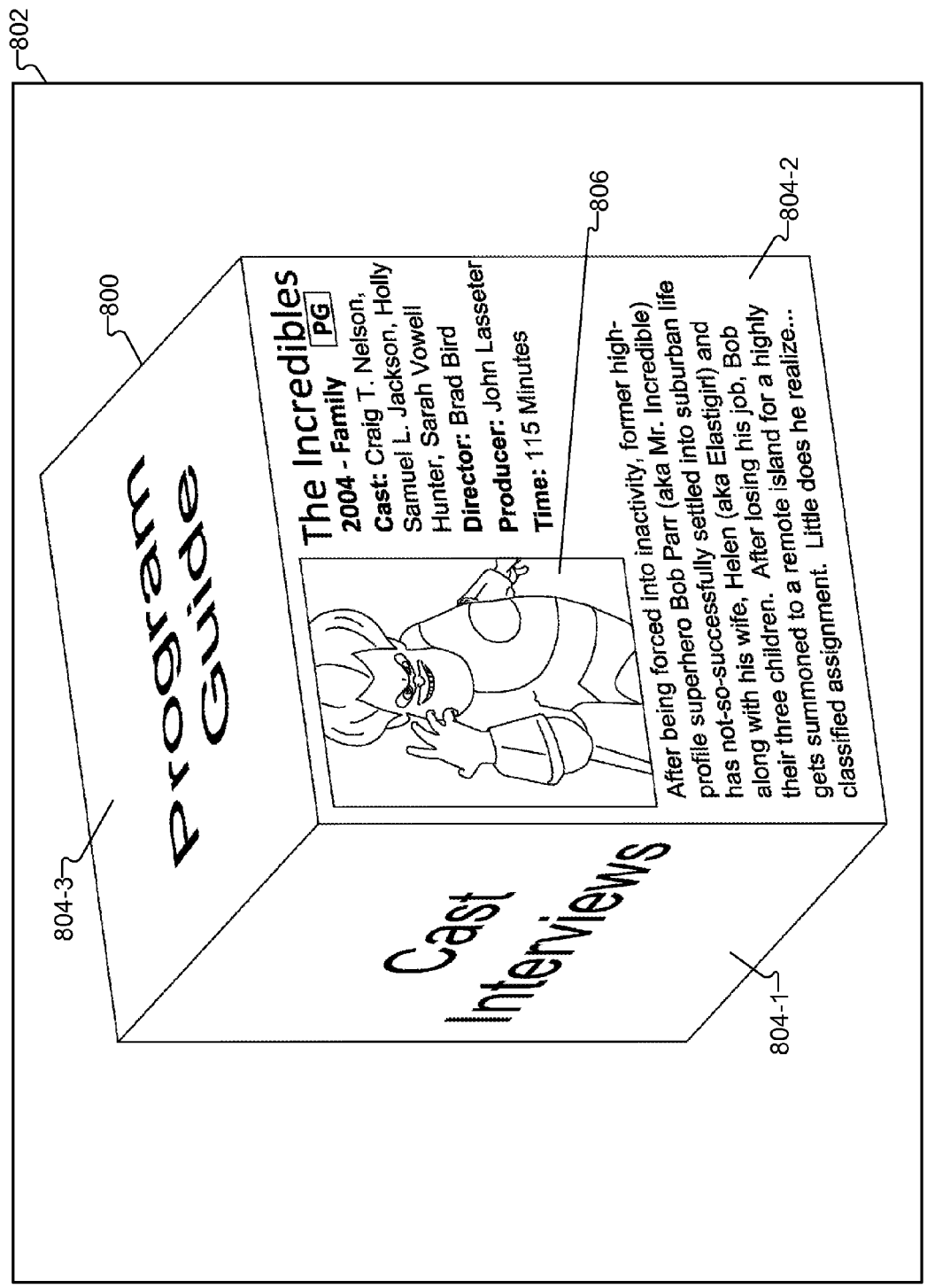
FIG. 8 illustrates an exemplary perspective view of a three-dimensional cube having display content displayed within multiple faces of the three-dimensional cube according to principles described herein.
Figure 9:
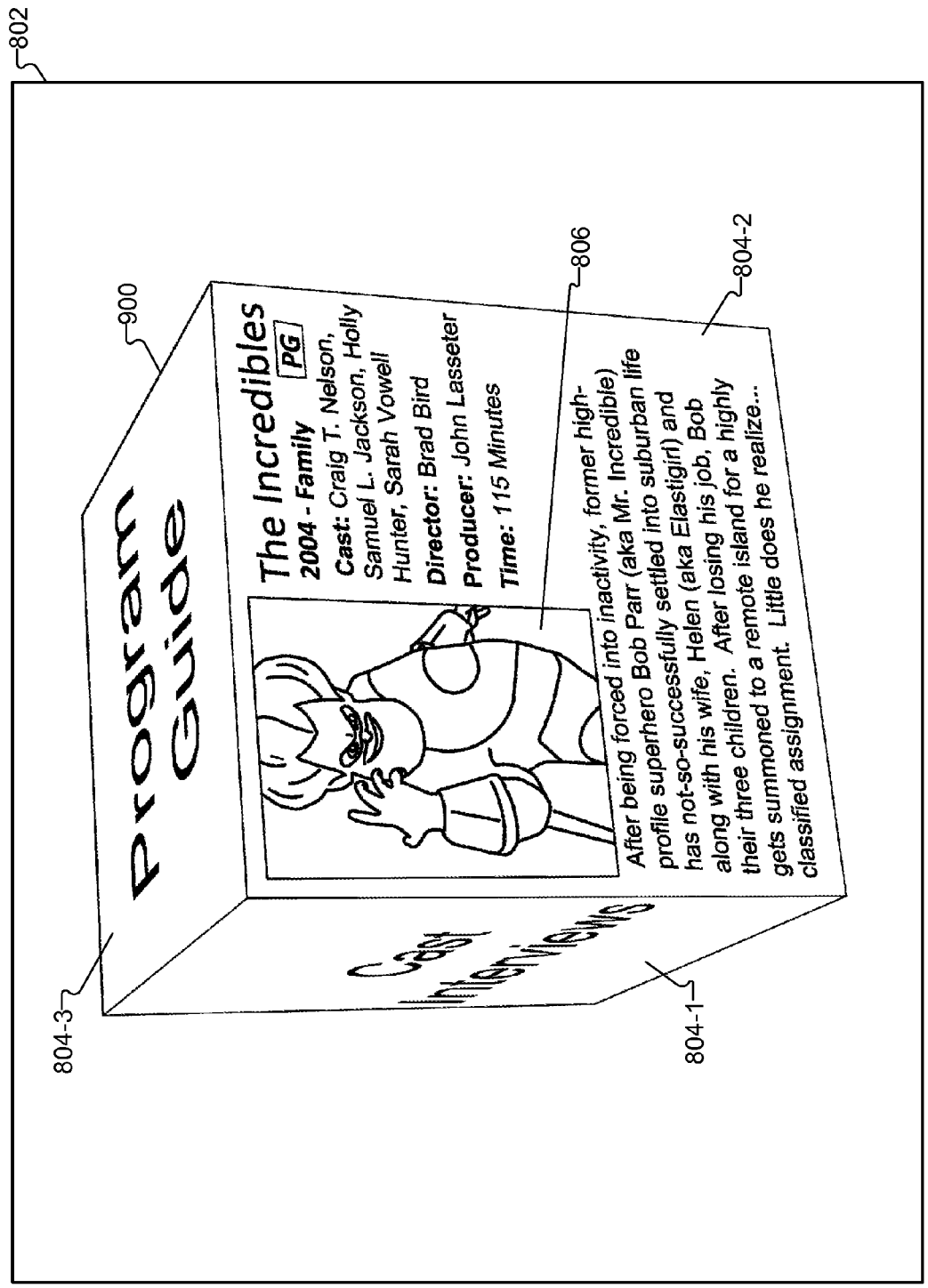
FIG. 9 illustrates an exemplary isometric view of a three-dimensional cube having display content displayed within multiple faces of the three-dimensional cube according to principles described herein.

As described above, content may be selected for association with one or more faces of a 3-D shape in accordance with a shape content selection heuristic. To further illustrate associations of content with faces of a 3-D cube, FIGS. 8-9 show exemplary views of 3-D cubes having display content displayed within multiple faces of the 3-D cubes. For example, FIG. 8 illustrates an exemplary perspective view of a 3-D cube 800 displayed within a GUI 802. As shown, display content is displayed within multiple faces 804-1, 804-2, and 804-3 of 3-D cube 800. In the example shown in FIG. 8, the display content includes media content and related information associated with a particular media content program known as "The Incredibles." As shown, cube face 804-2 may include information about the media content program, including, for example, title information (e.g., "The Incredibles"), release date information ("2004"), rating information (e.g., "PG"), genre information ("family"), cast information ("Craig T. Nielson," etc.), director information ("Brad Bird"), producer information ("John Lasseter"), time duration information ("115 minutes"), and at least a portion of a synopsis of the media content program. In addition, cube face 804-2 may include media content 806 associated with the media content program. Media content 806 may include an image associated with the media content program (e.g., a poster image and/or a frame associated with the media content program). Alternatively, media content 806 may include video content of the media content program being played back within cube face 804-2. Accordingly, the media content program may be played back within cube face 804-2.

As also shown in FIG. 8, cube face 804-1 may include display content in the form of cast interviews associated with the media content program. The display content may include playback of one or more cast interviews within cube face 804-1, information descriptive of cast interviews, or links to cast interviews. Cube face 804-3 may include display content in the form of program guide information. For example, program guide information related to the media content program may be displayed in cube face 804-3. For instance, the media content program may be received by access subsystem 204 at a particular time slot and/or on a particular program channel in accordance with a transmission schedule. Program guide information related to the particular time slot and/or program channel (e.g., program guide information within and/or adjacent to the particular time slot and/or program channel) may be displayed in cube face 804-3.

In certain examples, the display content illustrated in FIG. 8 may be selected for association with 3-D cube 800 based on a context within which a display of the 3-D cube is requested. For example, a request for display of 3-D cube 800 may be received within a context associated with "The Incredibles" media content program. To illustrate, a user watching "The Incredibles" media content program may provide user input requesting that a 3-D cube user interface be displayed. In response, system 100 may select display content related to "The Incredibles" media content program for associated with 3-D cube 800.

The perspective view of 3-D cube 800 shown in FIG. 8 is illustrative only. Other 3-D cubes and/or views of 3-D cube 800 may be displayed in other examples. For example, FIG. 9 illustrates an exemplary isometric view of a 3-D cube 900 displayed within GUI 802. As shown, the display content displayed within faces 804-1, 804-2, and 804-3 of 3-D cube 900 is the same or similar to the display content shown in FIG. 8, and FIG. 9 is provided primarily to illustrative another way in which a 3-D cube may be displayed in GUI 802. Other 3-D cubes and/or views of 3-D cubes, or other 3-D shapes and/or views of 3-D shapes, may be displayed in a GUI in other examples as may suit a particular implementation.

The content included in 3-D cube 800 in FIGS. 8-9 is illustrative only. Other content and/or arrangements of content may be included in 3-D cube 800 in other examples. In certain embodiments, for instance, a face of 3-D cube 800 (e.g., cube face 804-2) include playback information (e.g., start time, end time, duration, playback position, playback speed, etc.) related to a playback of "The Incredibles" media content program, and other faces of 3-D cube 800 may include additional content and/or information (e.g., cast information, trivia, web page, social network page, etc.) related to "The Incredibles" media content program.

As mentioned, content may be selected for association with a 3-D shape based on one or more conditions specified by a shape content selection heuristic. The shape content selection heuristic may be defined as may suit a particular implementation and/or user. Several exemplary content selection conditions will now be described. The examples are illustrative only. Other conditions may be defined and used in other examples.

In certain embodiments, a selection of content for association with a 3-D shape may be based at least in part on a type of trigger event that initiated the content selection. For example, a selection of content may be based at least in part on a particular requested direction and/or type of rotation of a 3-D shape. In some example, for instance, a request for a vertical rotation of a 3-D shape may trigger a selection of a particular type of content, and a request for a horizontal rotation of a 3-D shape may trigger a selection of another particular type of content.

Additionally or alternatively, in certain embodiments, a selection of content for association with a 3-D shape may be based at least in part on a particular instance of content and/or type of content that is already associated with the 3-D shape. For example, a selection of content for association with a face of the 3-D shape may be based at least in part on the content or type of content that is associated with another face (e.g., an adjacent face) of the 3-D shape.

Additionally or alternatively, in certain embodiments, a selection of content for association with a 3-D shape may be based at least in part on content that is currently accessible by access subsystem 204. For example, when a primary content option is not accessible, a secondary content option may be selected for association with the 3-D shape.

Figure 10:
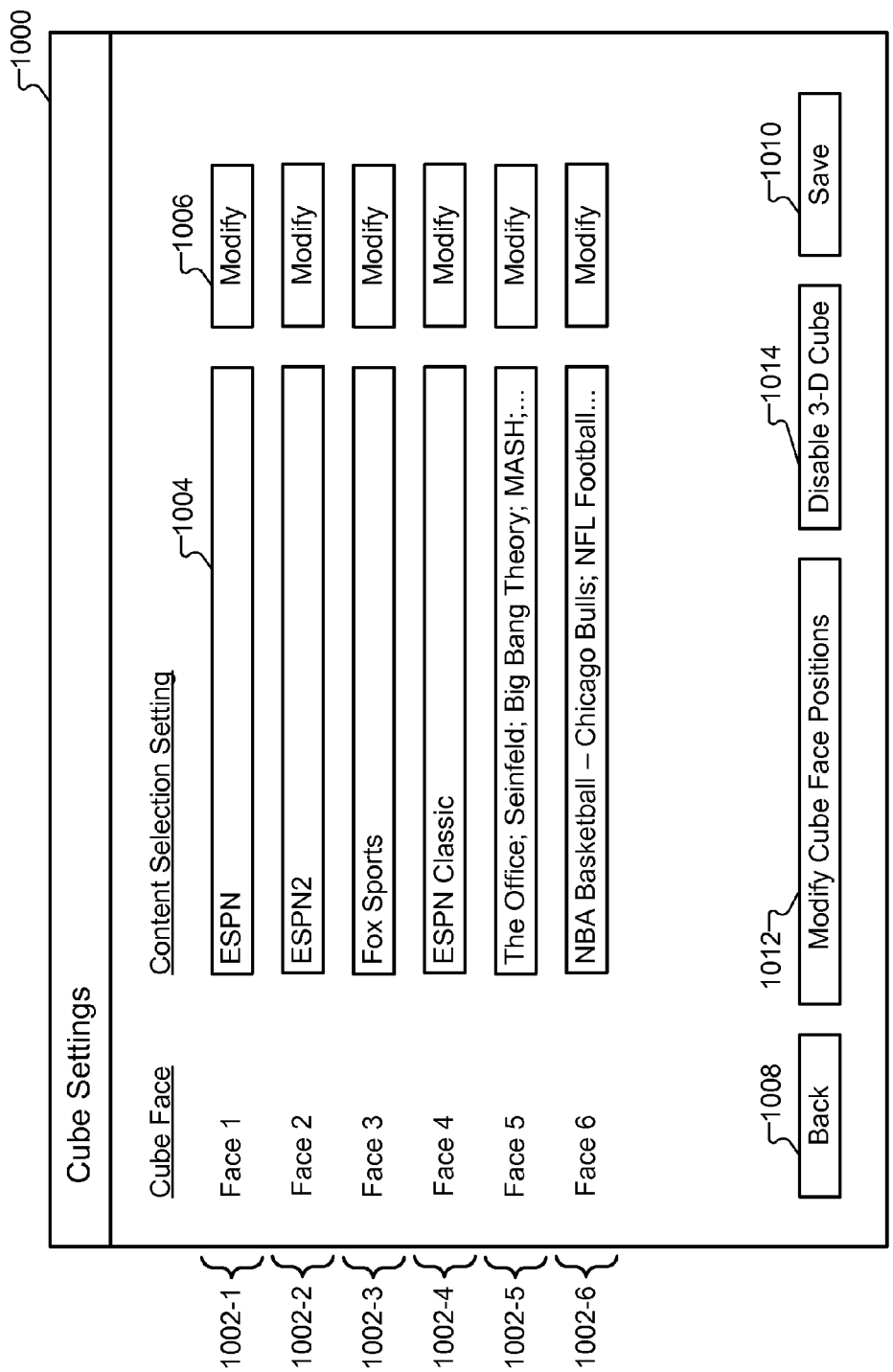
FIG. 10 illustrates as exemplary graphical user interface that may be presented for use by a user to view and/or define one or more cube settings according to principles described herein.

Additionally or alternatively, in certain embodiments, a selection of content for association with a 3-D shape may be based at least in part on one or more user-configured conditions. For example, a user of access subsystem 204 may provide input specifying one or more conditions to be used by system 100 to select content for association with a 3-D shape. To this end, user interface facility 106 may be configured to provide one or more tools that may be used by an end user to customize one or more user-configured conditions. For example, FIG. 10 illustrates as exemplary GUI 1000 that may be presented for use by a user to view and/or customize one or more settings for one or more faces of a 3-D cube. As shown, GUI 1000 may include a settings tool (e.g., tools 1002-1 through 1002-6) for each face of a 3-D cube. Using a settings tool (e.g., tool 1002-1), the user may view and/or define one or more conditions to be used by system 100 to select content to associate with the cube face corresponding to the settings tool. To illustrate, a user may utilize settings tool 1002-1 to view current settings 1004 for a first cube face (i.e., "Face 1") and/or to modify the settings for the first cube face. The user may select a "modify" button 1006 to launch a settings definition tool that may enable the user to select and/or otherwise define new settings to be used for selecting content for the first cube face.

FIG. 10 illustrates exemplary settings for the faces of a 3-D cube. For a first cube face ("Face 1"), content received on a particular preferred program channel known as "ESPN" will be selected for association with the first cube face. For a second cube face ("Face 2"), content received on a particular preferred program channel known as "ESPN2" will be selected for association with the second cube face. For a third cube face ("Face 3"), content received on a particular preferred program channel known as "Fox Sports" will be selected for association with the third cube face. For a fourth cube face ("Face 4"), content received on a particular preferred program channel known as "ESPN Classic" will be selected for association with the fourth cube face.

For a fifth cube face ("Face 5"), content associated with a particular preferred media program series will be selected for association with the fifth cube face. The settings for the fifth cube face indicate an order of priority by which the media program series may be selected. For example, if an episode of a first priority media program series known as "The Office" is accessible, the fifth face may be populated with content of "The Office." However, if an episode of "The Office" is not accessible, an episode of a second priority media program series known as "Seinfeld" may be selected if accessible and used to populate the fifth cube face, and so on through the priority list of media program series until an available episode is identified and accessed.

For a sixth cube face ("Face 6"), content having certain predefined preferred attributes will be selected for association with the sixth club face. As shown, the attributes specified may include a particular sports league and team such that content associated with a sporting event of a particular sports league and including a participating sports team will be selected for association with the sixth cube face. For example, if content representing a National Basketball Association ("NBA") basketball game including a team known as the "Chicago Bulls" is available, the sixth cube face may be populated with the content. However, if an NBA basketball game including the "Chicago Bulls" is not available, content representing a National Football League ("NFL") football game including a specified team (e.g., a team known as the "Chicago Bulls") may be selected if available for association with the sixth cube face. As illustrated by these exemplary settings, a user may be provided with significant control to customize conditions that may be used by system 100 to select content for association with a 3-D cube user interface.

As shown in FIG. 10, a user may exit GUI 1000 without saving any changes to content selection settings by selecting a "back" button 1008. The user may instruct system 100 to save any changes to content selection settings by selecting a "save" button 1010. System 100 may also provide the user with a tool that may be used to modify cube face positions of a 3-D cube. For example, the user may select a "modify cube face positions" button 1012 to access a tool that may be used to rearrange the positions of cube faces within a 3-D cube. For example, the first three cube faces listed in GUI 1000 may be automatically displayed when a 3-D cube is initially displayed. Accordingly, a user may select which of the cube faces will be initially displayed upon launch of a 3-D cube user interface. System 100 may also provide the user with a tool that may be used to selectively enable and disable a 3-D cube user interface. For example, the user may select button 1014 in GUI 1000 to enable or disable the 3-D cube user interface.

The above-described examples are illustrative of the many conditions and/or combinations of conditions that may be used to select content for association with a 3-D shape such as a 3-D cube. Other conditions may be used as bases for shape content selection in other examples.

Figure 11:
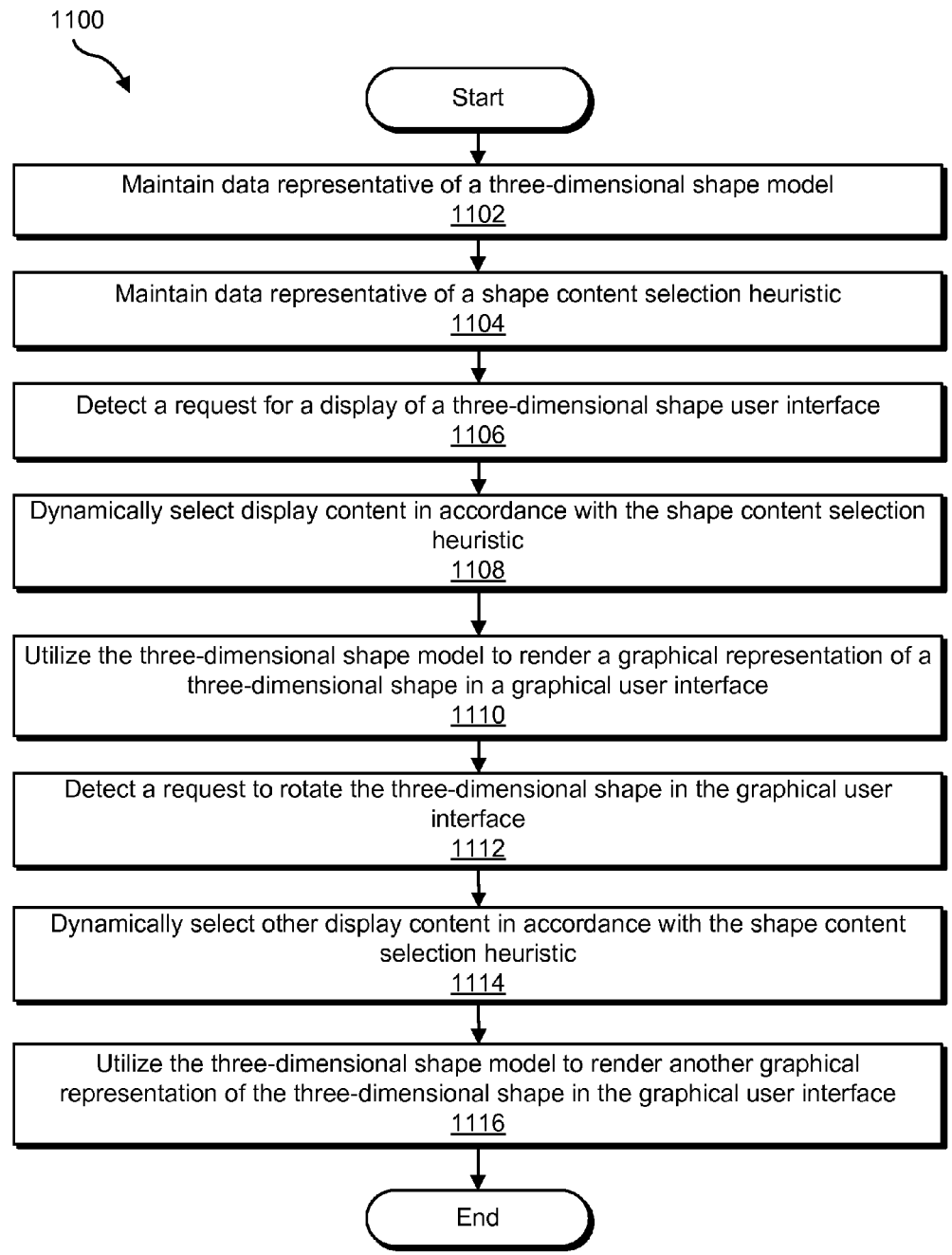
FIG. 11 illustrates another exemplary method of providing a three-dimensional shape user interface according to principles described herein.

FIG. 11 shows another exemplary method 1100 of providing a 3-D shape user interface. While FIG. 11 illustrates exemplary steps according to one embodiment, other embodiments may omit, add to, reorder, combine, and/or modify any of the steps shown in FIG. 11. The steps shown in FIG. 11 may be performed by any component or combination of components of system 100.

In step 1102, data representative of a 3-D shape model may be maintained. Step 1102 may be performed in any of the ways described above.

In step 1104, data representative of a shape content selection heuristic may be maintained. Step 1104 may be performed in any of the ways described above.

In step 1106, a request may be detected for a display of a 3-D shape user interface. For example, user interface facility 106 and/or shape facility 108 may detect data representative of user input requesting the display of the 3-D shape user interface.

In step 1108, content may be dynamically selected in accordance with the shape content selection heuristic. Step 1108 may be performed in response to the request detected in step 1106. For example, shape facility 108 may dynamically select content in accordance with the shape content selection heuristic in response to the request received in step 1106. The selection may be based on any condition or conditions specified by the shape content selection heuristic, including any of the exemplary conditions disclosed herein.

In step 1110, the 3-D shape model maintained in step 1102 may be utilized to render a graphical representation of a 3-D shape in a GUI. For example, shape facility 108 may utilize the 3-D shape model to generate data representative of a 3-D shape and associations of content dynamically selected in step 1108 with the 3-D shape. Shape facility 108 may provide this data to user interface facility 106 and direct user interface facility 106 to utilize the data to render the 3-D shape in a GUI.

In step 1112, a request is detected to rotate the 3-D shape in the GUI. For example, user interface facility 106 and/or shape facility 108 may detect data representative of user input requesting a rotation of the 3-D shape in the GUI.

In step 1114, other content may be dynamically selected in accordance with the shape content selection heuristic. Step 1114 may be performed in response to the request detected in step 1112. For example, shape facility 108 may dynamically select other (e.g., additional and/or alternate) content in accordance with the shape content selection heuristic in response to the shape rotation request detected in step 1112. The selection may be based on any condition or conditions specified by the shape content selection heuristic, including any of the exemplary conditions disclosed herein.

In step 1116, the 3-D shape model maintained in step 1110 may be utilized to render another graphical representation of the 3-D shape in the GUI. For example, shape facility 108 may utilize the 3-D shape model to generate data representative of another view of the 3-D shape and associations of content dynamically selected in step 1116 with the 3-D shape. Shape facility 108 may provide this data to user interface facility 106 and direct user interface facility 106 to utilize the data to render the other view of the 3-D shape in the GUI.

Figure 12:
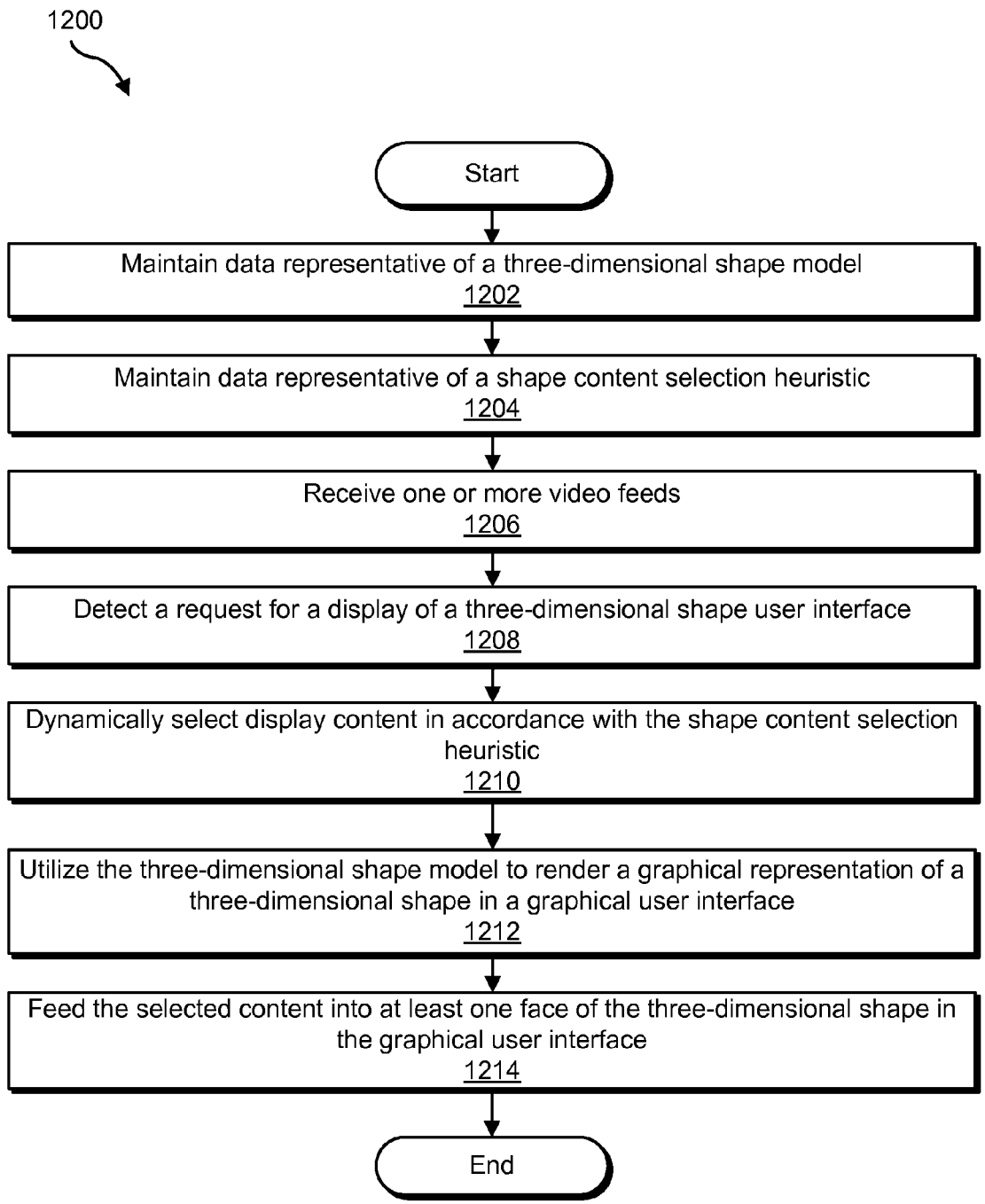
FIG. 12 illustrates another exemplary method of providing a three-dimensional shape user interface according to principles described herein.

FIG. 12 shows another exemplary method 1200 of providing a 3-D shape user interface. While FIG. 12 illustrates exemplary steps according to one embodiment, other embodiments may omit, add to, reorder, combine, and/or modify any of the steps shown in FIG. 12. The steps shown in FIG. 12 may be performed by any component or combination of components of system 100.

In step 1202, data representative of a 3-D shape model may be maintained. Step 1202 may be performed in any of the ways described above.

In step 1204, data representative of a shape content selection heuristic may be maintained. Step 1204 may be performed in any of the ways described above.

In step 1206, one or more video feeds may be received. For example, communication facility 102 may receive one or more video feeds carrying one or more video content programs. In some examples, access subsystem 204 may receive one or more video feeds transmitted by distribution subsystem 202.

In step 1208, a request may be detected for a display of a 3-D shape user interface. For example, user interface facility 106 and/or shape facility 108 may detect data representative of user input requesting the display of the 3-D shape user interface.

In step 1210, content may be dynamically selected in accordance with the shape content selection heuristic. Step 1210 may be performed in response to the request detected in step 1208. For example, shape facility 108 may dynamically select content in accordance with the shape content selection heuristic in response to the request detected in step 1208. The selection may be based on any condition or conditions specified by the shape content selection heuristic, including any of the exemplary conditions disclosed herein. In certain embodiments, the selection may include selecting at least one of the video feeds from the one or more video feeds received in step 1206.

In step 1212, the 3-D shape model maintained in step 1202 may be utilized to render a graphical representation of a 3-D shape in a GUI. For example, shape facility 108 may utilize the 3-D shape model to generate data representative of a 3-D shape and associations of content dynamically selected in step 1210 with the 3-D shape. Shape facility 108 may provide this data to user interface facility 106 and direct user interface facility 106 to utilize the data to render the 3-D shape in a GUI.

In step 1214, the content dynamically selected in step 1210 is fed into at least one of the faces of the 3-D shape such that the graphical representation of the 3-D rendered in step 1212 displays the selected content in at least one of the faces of the 3-D shape. In certain examples, the content is fed into at least one of the faces of 3-D shape in real time. For example, at least one video feed selected in step 1210 may be fed into at least one face of 3-D shape in real time.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a non-transitory computer-readable medium and configured to direct one or more computing devices to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 13:
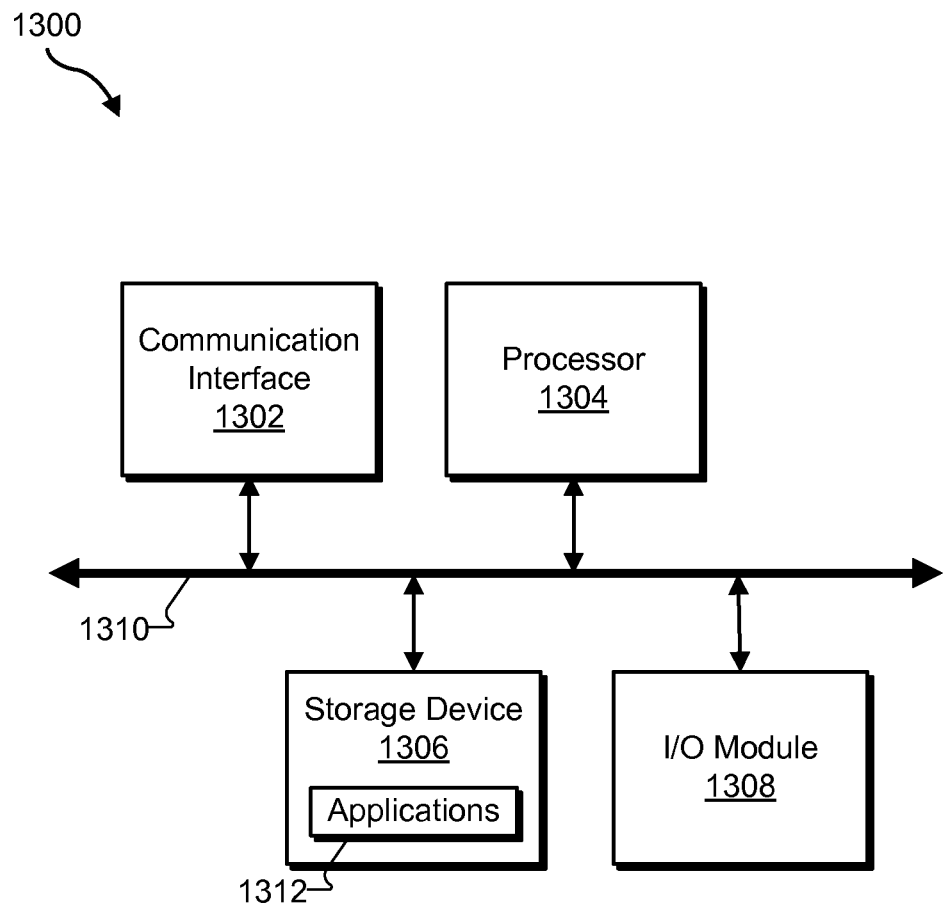
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, and any other suitable interface. Communication interface 1302 may additionally or alternatively provide such a connection through, for example, a local area network (such as an Ethernet network), a personal area network, a telephone or cable network, a satellite data connection, a dedicated URL, or any other suitable connection. Communication interface 1302 may be configured to interface with any suitable communication media, protocols, and formats, including any of those mentioned above.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another non-transitory computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 (which may include, but are not limited to, one or more of the software applications described herein) configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), one or more video cameras, one or more spatial input sensors, and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1308 is configured to provide graphical data to a display for presentation to a user. The graphical data may be representative of one or more GUIs and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with communication facility 102, media content processing facility 104, user interface facility 106, and/or shape facility 108. Likewise, storage facility 110 may be implemented by or within storage device 1306.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    maintaining, by a media content delivery computing system comprising at least one computing device, data representative of a three-dimensional ("3-D") shape model including a plurality of shape faces;
    dynamically selecting, by the media content delivery computing system in accordance with a shape content selection heuristic, display content for association with at least one of the plurality of shape faces; and
    utilizing, by the media content delivery computing system, the data representative of the 3-D shape model to render a graphical representation of a 3-D shape in a graphical user interface;
    wherein the graphical representation of the 3-D shape displays the at least one of the plurality of shape faces containing the display content dynamically selected by the media content delivery computing system in accordance with the shape content selection heuristic.

2. The method of claim 1, further comprising feeding, by the media content delivery computing system, the dynamically selected display content into the at least one of the plurality of shape faces in real time.

3. The method of claim 2, wherein the display content comprises streaming video content.

4. The method of claim 3, wherein:
    the plurality of shape faces comprises at least a first shape face and a second shape face;
    the streaming video content comprises a first video program and a second video program;
    the first shape face includes the first video program displayed therein; and
    the second shape face includes the second video program displayed therein.

5. The method of claim 1, further comprising:
    detecting, by the media content delivery computing system, user input requesting a display of a 3-D shape user interface;
    wherein the dynamically selecting and the utilizing are performed by the media content delivery computing system in response to the user input requesting the display of the 3-D shape user interface.

6. The method of claim 1, further comprising:
    detecting, by the media content delivery computing system, user input requesting that the 3-D shape be rotated in the graphical user interface;
    dynamically selecting, by the media content delivery computing system in accordance with the shape content selection heuristic and in response to the detecting of the user input, other display content for association with at least one other of the plurality of shape faces; and
    rotating, by the media content delivery computing system, the 3-D shape in the graphical user interface such that the graphical representation of the 3-D shape displays the at least one other of the plurality of shape faces containing the other display content.

7. The method of claim 6, wherein the user input requesting that the 3-D shape be rotated comprises a hand gesture provided by a user, the hand gesture mimicking a rotation of a physical object.

8. The method of claim 1, wherein the display content comprises information related to a media content program being presented by the media content delivery computing system during the rendering of the graphical representation of the 3-D shape.

9. The method of claim 1, further comprising providing, by the media content delivery computing system, at least one tool for use by an end user to customize at least one condition to be included in the shape content selection heuristic.

10. The method of claim 9, wherein the dynamically selecting of the display content for association with the at least one of the plurality of shape faces comprises dynamically selecting a live video feed for association with the at least one of the plurality of shape faces based at least in part on the at least one condition customized by the end user.

11. The method of claim 1, embodied as computer-executable instructions on at least one non-transitory computer-readable medium.

12. A method comprising:
    maintaining, by a media content delivery computing system comprising at least one computing device, data representative of a three-dimensional ("3-D") shape model including a plurality of shape faces;
    receiving, by the media content delivery computing system, one or more video feeds;
    utilizing, by the media content delivery computing system, the data representative of the 3-D shape model to render a graphical representation of a 3-D shape in a graphical user interface; and
    feeding, by the media content delivery computing system, at least one of the one or more video feeds into at least one of the plurality of shape faces in real time such that the graphical representation of the 3-D shape displays the at least one of the plurality of shape faces containing the at least one of the one or more video feeds.

13. The method of claim 12, further comprising:
    maintaining, by the media content delivery computing system, data representative of a shape content selection heuristic; and
    dynamically selecting, by the media content delivery computing system in accordance with the shape content selection heuristic, the at least one of the one or more video feeds for the feeding into the at least one of the plurality of shape faces.

14. The method of claim 12, wherein:
    the at least one of the plurality of shape faces comprises a first shape face and a second shape face within the plurality of shape faces;
    the at least one of the one or more video feeds comprises a first video program feed and a second video program feed;
    the first shape face includes the first video program feed displayed therein; and the second shape face includes the second video program feed displayed therein.

15. The method of claim 12, further comprising:
detecting, by the media content delivery computing system, user input requesting a display of a 3-D shape user interface;
wherein the utilizing and the feeding are performed by the media content access subsystem in response to the user input requesting the display of the 3-D shape user interface.

16. The method of claim 12, further comprising:
detecting, by the media content delivery computing system, user input requesting that the 3-D shape be rotated in the graphical user interface; and
rotating, by the media content delivery computing system, the 3-D shape in the graphical user interface.

17. The method of claim 12, further comprising providing, by the media content delivery computing system, at least one tool for use by an end user to customize at least one condition to be used by the media content delivery computing system to select the at least one of the one or more video feeds for the feeding into the at least one of the plurality of shape faces.

18. The method of claim 17, wherein the at least one condition customized by the end user specifies at least one of a program channel, a media content program series, and a media content attribute to be used to select the at least one of the one or more video feeds for the feeding into the at least one of the plurality of shape faces.

19. The method of claim 12, embodied as computer-executable instructions on at least one non-transitory computer-readable medium.

20. A system comprising:
a media content distribution subsystem configured to transmit a plurality of video feeds; and
a media content access subsystem comprising at least one processor, the media content distribution subsystem communicatively coupled to the media content distribution subsystem and configured to
maintain, in a storage device, data representative of a three-dimensional ("3-D") shape model including a plurality of shape faces,
receive the plurality of video feeds from the media content distribution subsystem,
dynamically select, based at least in part on an end-user-configured condition specified by a shape content selection heuristic, at least one of the plurality of video feeds for association with at least one of the plurality of shape faces,
utilize the data representative of the 3-D shape model to render a graphical representation of a 3-D shape in a graphical user interface, and
feed the dynamically selected at least one of the plurality of video feeds into the at least one of the plurality of shape faces in real time such that the graphical representation of the 3-D shape displays the at least one of the plurality of shape faces containing the at least one of the plurality of video feeds.

21. The system of claim 20, wherein the end-user-configured condition specifies at least one of a preferred program channel, a preferred media content program series, and a preferred media content attribute.

22. The system of claim 20, wherein:
the 3-D shape model comprises a 3-D cube model;
the plurality of shape faces includes a plurality of cube faces; and
the graphical representation of the 3-D shape in the graphical user interface comprises a graphical representation of a 3-D cube in the graphical user interface.

* * * * *